United States Patent
Waugh et al.

(10) Patent No.: US 8,225,302 B2
(45) Date of Patent: Jul. 17, 2012

(54) SYSTEM AND METHOD FOR MANAGING SOURCE CODE AND ACQUIRING METRICS IN SOFTWARE DEVELOPMENT

(76) Inventors: Lawrence Taylor Waugh, Austin, TX (US); Sandeep Kumar Gupta, Austin, TX (US)

( * ) Notice: Subject to any disclaimer, the term of this patent is extended or adjusted under 35 U.S.C. 154(b) by 1017 days.

(21) Appl. No.: 10/778,946

(22) Filed: Feb. 13, 2004

(65) Prior Publication Data

US 2004/0230964 A1 Nov. 18, 2004

Related U.S. Application Data

(60) Provisional application No. 60/447,121, filed on Feb. 13, 2003.

(51) Int. Cl.
G06F 9/44 (2006.01)
G06F 9/445 (2006.01)
(52) U.S. Cl. ......... 717/170; 717/122; 717/168; 717/175
(58) Field of Classification Search .................. 717/122
See application file for complete search history.

(56) References Cited

U.S. PATENT DOCUMENTS

| | | | | |
|---|---|---|---|---|
| 5,956,513 A * | 9/1999 | McLain, Jr. | ............... | 717/142 |
| 6,112,024 A * | 8/2000 | Almond et al. | ............... | 717/122 |
| 6,618,854 B1 * | 9/2003 | Mann | ............... | 717/124 |
| 6,681,382 B1 * | 1/2004 | Kakumani et al. | ............ | 717/122 |
| 6,983,460 B1 * | 1/2006 | Goire et al. | ................ | 717/175 |
| 6,993,759 B2 * | 1/2006 | Aptus et al. | ................ | 717/170 |
| 7,086,046 B2 * | 8/2006 | Barsness et al. | .............. | 717/152 |
| 7,426,717 B1 * | 9/2008 | Schang et al. | ............... | 717/124 |
| 7,500,234 B2 * | 3/2009 | Hatasaki | ...................... | 717/168 |
| 2002/0144253 A1 * | 10/2002 | Kumhyr | ........................ | 717/170 |
| 2003/0033597 A1 * | 2/2003 | Allsop et al. | .................. | 717/169 |
| 2003/0110472 A1 * | 6/2003 | Alloing et al. | ................ | 717/122 |
| 2005/0015762 A1 * | 1/2005 | Steckler et al. | .............. | 717/176 |
| 2005/0097548 A1 * | 5/2005 | Dillenburg et al. | .......... | 717/177 |
| 2005/0229159 A1 * | 10/2005 | Haba et al. | .................... | 717/122 |
| 2006/0015863 A1 * | 1/2006 | Vaidyanathan et al. | ...... | 717/170 |
| 2006/0236319 A1 * | 10/2006 | Pinnix et al. | ................. | 717/170 |

OTHER PUBLICATIONS

Mihajlovic et al., Tracking software projects with the integrated version control in SMIT, Mar. 2001, 6 pages, <http://delivery.acm.org/10.1145/510000/505787/p38-mihajlovic.pdf>.*

Cox et al., A model independent source code repository, Nov. 1999, 14 pages, <http://delivery.acm.org/10.1145/790000/781996/p1-cox.pdf>.*

(Continued)

*Primary Examiner* — Thuy Dao
(74) *Attorney, Agent, or Firm* — Louis L. Wu

(57) ABSTRACT

A method and system is described for managing the development of software source code, and in addition, collecting useful metrics about the development process. A first source code is provided in a desired state. The desired state may be the requirement that the source code can be built or the desired state may be the requirement that the source code can be built and pass one or more tests. A second source code is then received. The second source may be a modified copy of the source code. It is then determined whether the second source code is in the desired state, and the first source code is updated using the second source code in response to the second source code being in the desired state. Metrics that may be collected include: the name of a task, time to complete the task, line of code involved, etc.

42 Claims, 23 Drawing Sheets

OTHER PUBLICATIONS

Cederqvist et al., Version Management with Version Control System CVS, 2005, 214 pages, <http://ftp.gnu.org/non-gnu/cvs/source/feature/1.12.13/cederqvist-1.12.13.pdf>.*

"Pathways to Process Maturity: The Personal Software Process and Team Software Process", Watts S. Humphrey, SEI Interactive, Jun. 1999.

* cited by examiner

SYSTEM AND METHOD FOR MANAGING SOURCE CODE AND ACQUIRING METRICS IN SOFTWARE DEVELOPMENT

I. CROSS REFERENCE TO RELATED APPLICATIONS

This application claims priority to U.S. provisional application Ser. No. 60/447,121, filed on Feb. 13, 2003, the entire contents of which are hereby incorporated by reference herein for all purposes.

II. BACKGROUND OF THE INVENTION

A. Technical Field

The present invention relates in general to a system and method for managing software development. In particular, the present invention relates to a system and method for managing a source code repository and collecting metrics on the software development process.

B. Description of the Related Art

Software development is an error-prone, opaque process. The development process can involve managing multiple versions of hundreds of source code files while ensuring that the files can be built together as well as pass multiple tests. Often, multiple people are working on editing and adding and deleting files from the source code repository at the same time. Monitoring this process and ensuring the production of a high quality software product can be an overwhelming experience.

Many tools have been developed to assist in the management of the source code files and in the improvement of the overall quality of the software products. These tools, however, are typically very difficult to implement. The software development tools require great changes in the software development process, which is something many developers are reluctant to do. Many organizations (such as the Software Engineering Institute) have attempted to improve software management by adopting and recommending sets of rules and procedures. Developers, however, find these rules and procedures also very difficult to implement successfully.

The complexity involved in software development also makes the collection of useful metrics about the process extremely difficult. The collection of metrics can be used by developers in many useful ways such as assessing the performance of individual programmers, determining how difficult the development of a particular module might be, etc. Metrics can also be very useful in predicting time and cost associated with the development of a particular module or product.

What is needed, therefore, is a system and method that could more efficiently oversee the software development process, and at the same time, increase the overall quality of the software product. In addition, the system and method should provide an easy and efficient way to collect metrics on the software development process and should also provide a way to use those metrics to, among other things, assess the performance of programmers and predict time and cost of development.

III. SUMMARY

It has been discovered that the aforementioned challenges can be addressed by a method and a system that monitors modifications made to the source code files in a source code repository to ensure that the source code remains in a desired state. In addition, the system and method collect metrics such as time, lines of code, reason for making modifications, etc. in order to assist with the better evaluation of the software development process.

A first source code is provided in a desired state. The desired state may be the requirement that the source code can be built or the desired state may be the requirement that the source code can be built and pass one or more tests. A second source code is then received. The second source may be a modified copy of the source code. It is then determined whether the second source code is in the desired state, and the first source code is updated using the second source code in response to the second source code being in the desired state.

If the first source code includes modifications not included in the second source code, the second source may be first updated using the first source. The first and second source code may be, for example, modified copies of an initial source code. To update the second source code, differences between the first and second source code are determined and then applied to the second source. A merge conflict may occur if the first source and the second source contain different modifications of the same line of code.

A current build string, a string that indicates the current build version of the source code, is identified. The build string may be identified, for example, by accessing a file containing the build string. Using the current build string, the next build string is determined. The next build string may be then added to the second source code in response to the second source code being in the desired state, which may include the requirement of being able to build the second source code. If the build strings are stored in a file, the next build string is then added to the file. A link may also be added to the next build string pointing to the current version of the second source code.

Another source code is provided and a modified copy of the source is then received. The modified copy of the source code may only correspond to a subset of the source code or all the source code. One or more modifications made to the source code to obtain the modified copy of the source code are determined, and in addition, one or more portions of the source code affected by the modifications are determined. Data associated with those affected portions is retrieved from a database. The data associated with the affected portions includes information on which previous modifications that gave rise to the affected portions.

The data collected from previous modifications may include: modification date, task name, programmer's name, reason for modification, modified files of the source code, modified lines of code, number of modified lines of code, programming language, on-task time, active time, elapsed time, and estimated time. The reason for a modification may be to repair a defect, to add new features to the software product, or to make an administrative change. Modifications may include: adding lines to the source code, deleting lines from the source code, changing lines in the source code, and moving lines of code.

For each of the tasks corresponding to (responsible for) the modifications, a number of affected portions corresponding to each task is computed. A most responsible task may then be determined by selecting the task having given rise to the highest number of affected portions. Other statistical methods may also be used to determine the most responsible task.

Other source code in the source code repository, such as source belonging to other branches, is searched to determine whether the other source code contains one or more of the affected portions of the source code. The determination could be performed by searching the source code for matching lines of code. For other source code found to contain one or more affected portions, an attempt is made to apply, to those affected portions, the modifications corresponding to those affected portions. If, for example, the modification was made to repair a defect in the source code, the same modification may also repair the defect in the other source code. The other source code may be tested before applying the modifications in order to determine whether the modifications take the other source out of a desired state (such as no longer being able to build the other source and/or the code no longer being able to pass one or more tests).

For each of the modified files in the source, a corresponding number of moved lines of code, changed lines of code, deleted lines of code, and added lines of code may be computed. For each developer, a distraction factor may be computed, the distraction factor being the ratio of on-task time to active time. An on-task time is time that elapsed from the opening of the task to the closing of the task. Active time excludes from the elapsed time any periods that the task was placed on pause, for example.

A tag indicating the current version of the one or more files of the source code may be applied to the source code files at a request for a copy of the source code. Upon receiving a modified copy of the source code, only the tags of the files that were modified are updated. The modified copy of the source may be received only in response to the modified copy of the source code being in a desired state. Alternatively, is response to a request for a copy of the source code, a first tag may be recorded in a tag file to indicate the version of the source code files at the time the request was received. Upon a request for a second copy of the source code, a second tag may be recorded in a tag file indicating the version of the source code files at the time of the second request.

One or more tests may be executed to determine whether the source code is in a given state and test attributes could be collected during the execution of the tests such as the time it takes to complete a test, whether the passed or failed, and if it failed, where in the source code the test failed. The collected test attributes may be used to determine when and how often to execute a test when testing the source code. The collected test attributes may be combined with existing test attributes as well test attributes provided by one or more users. Additional test attributes may be computed such as the average execution time for a test and the failure likelihood for a test.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

IV. BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

V. DETAILED DESCRIPTION

The following is intended to provide a detailed description of example embodiments and should not be taken to be limiting of the invention itself. Rather, any number of variations may fall within the scope of the invention defined in the claims following the description.

Figure 1:
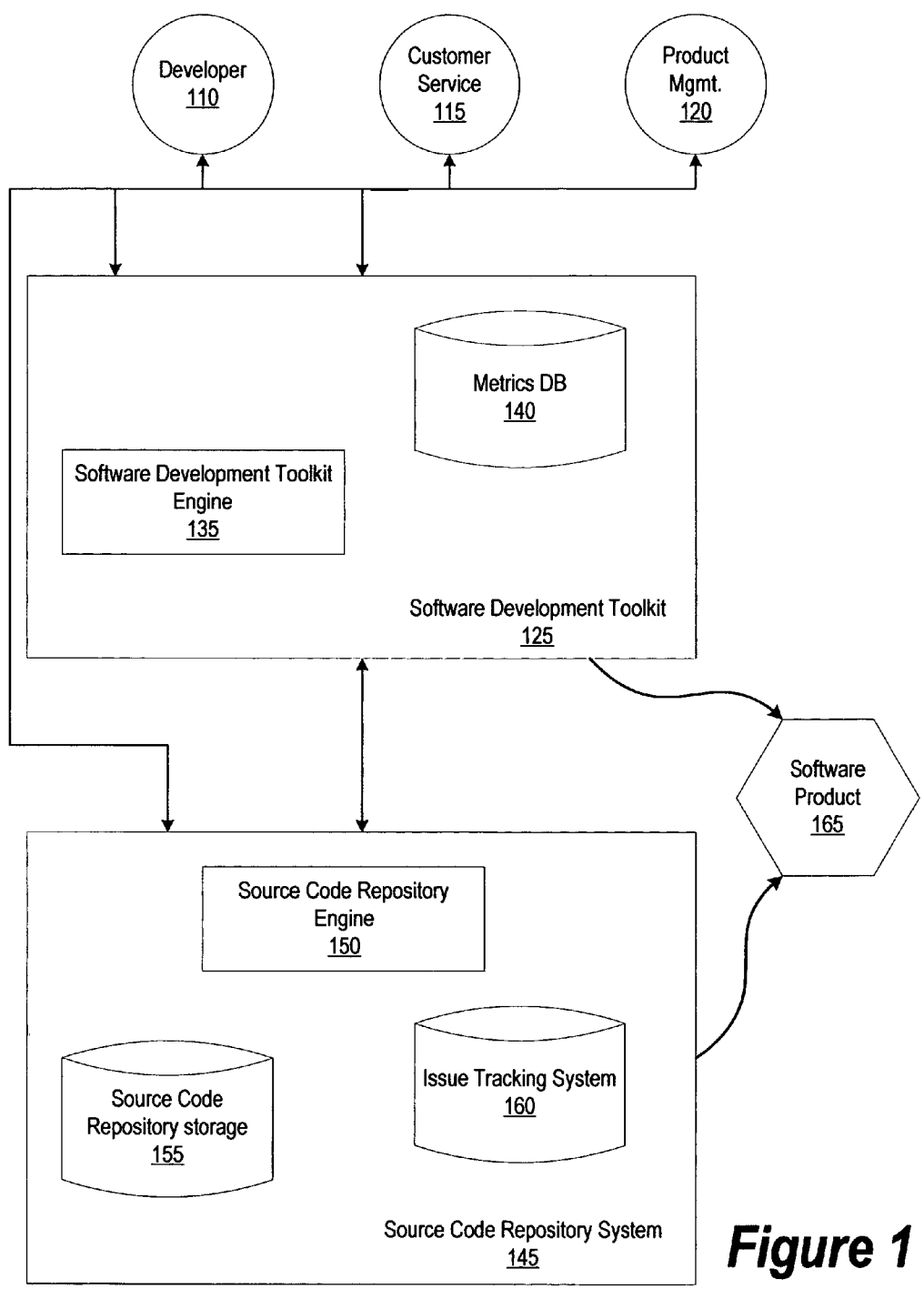
FIG. 1 is a block diagram illustrating one embodiment of a system for enhancing software development.

FIG. 1 is a block diagram illustrating one embodiment of a system for enhancing software development. Software development toolkit 125 is adapted to provide an interface between existing source code repository system 145 and developer 110, customer service 115, and product management 120 (referred to collectively as the users). Software development toolkit 125 may also be adapted to provide additional features and services.

Source code repository system 145 may comprise source code repository engine 150, source code repository storage 155, and issue tracking system storage 160. Source code repository storage 155 is adapted to store the different versions of the source code files associated with software product 165. Issue tracking system storage 160 is adapted to store one or more tasks associated with the development of software product 165. Examples of tasks include: adding features, repairing defects, making administrative changes, etc. In addition, issue tracking system storage 160 may include other data related to each task such as a flag indicating whether the task is active, the name of the developer in charge, the reason for creating the task, the modifications to the source code made by the task, etc. Source code repository engine 150 may be adapted to provide an interface for source code repository system 145, and in addition, manage source code files stored in the source code repository storage 155. Source code repository engine 150 may also be adapted to execute basic tasks such comparing files of different versions and providing the differences, etc.

In one embodiment, software development toolkit 125 comprises software development toolkit engine 135 and metrics database 140. Software development toolkit engine 135 is adapted to provide an enhanced interface between the users and the source code repository system as well as collect metrics on the software development process. The collected metrics as well as additional computed data are stored in metrics database 140.

In one embodiment, software development toolkit 135 is adapted to assist in the opening and closing of tasks after receiving such requests from developer 110. In one embodiment, software development toolkit 125 may only open an issue if the requesting developer does not have another active issue, in which case software development toolkit 125 provides a copy of the current version of the source code to the requesting developer. The software development toolkit is also adapted to handle other related task commands such as pause, resume, abandon, etc.

In addition, software development toolkit 125 is also adapted to close an issue and update the main source code in source code repository storage 155 with the modified copy of the source code. In one embodiment, software development toolkit 125 will not permit the update unless the merged source code passes one or more tests or requirements. For example, a requirement may be that the merged source code must be buildable prior to the update. Another requirement may be that the merged source code is buildable, and in addition, that the merged source code passes one or more tests after a successful build.

Software development toolkit 125 may be adapted to collect metrics on the software development process, and in addition, generate statistics and make predictions using those metrics. In one embodiment, software development toolkit 125 may determine a total elapsed time for a task, a total time a task was active, the developer in charge of the task, the modifications made to the source code by the task, the number of lines added, changed, and deleted, etc.

Software development toolkit 125 may be further adapted to administer one or more tests designed to test the source code. In addition, software development toolkit 125 may collect information (such as the time it took for the test to run, how often and where a test fails, etc.) in order to determine when and how often to execute the one or more tests.

Figure 2:
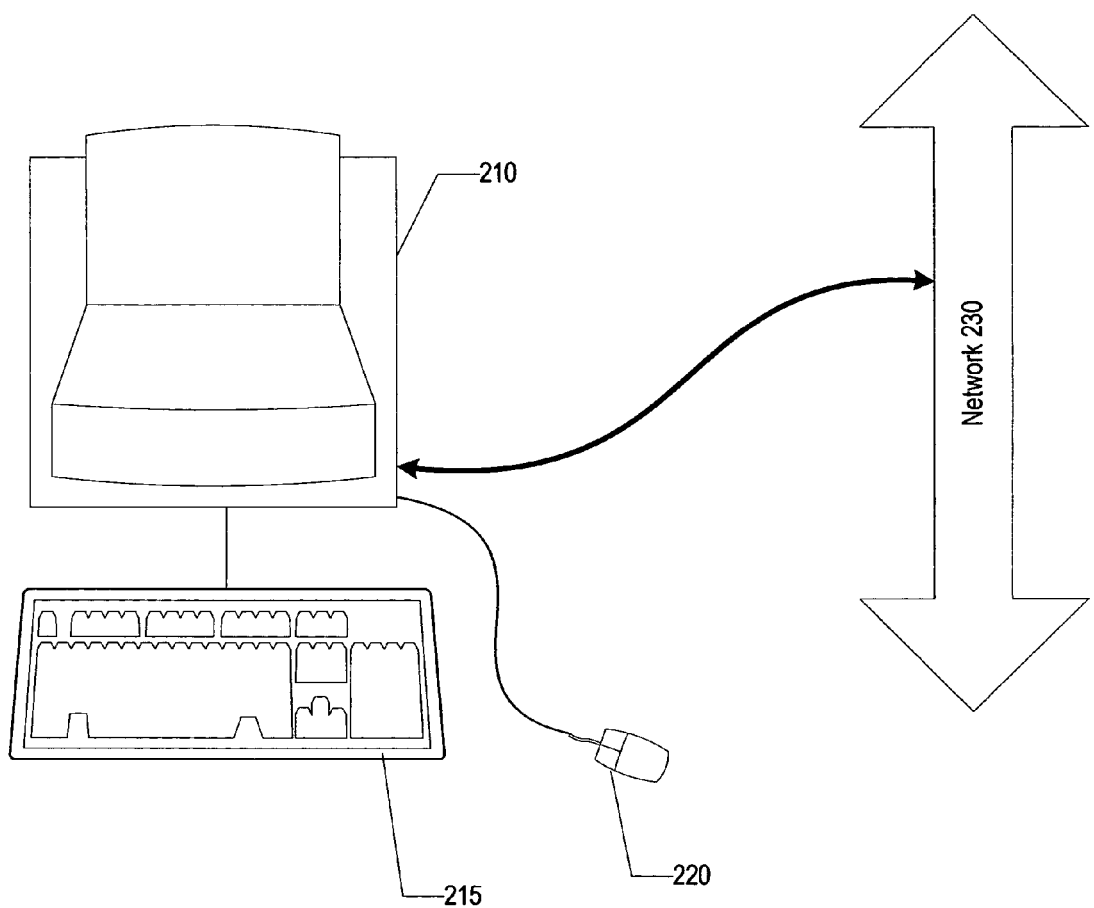
FIG. 2 is a block diagram illustrating one embodiment of a computer system capable of executing the processes described herein.

FIG. 2 is a block diagram illustrating one embodiment of a computer system capable of executing the processes described here. As shown, computer system 210 comprises keyboard 215 as well as mouse 220 through which one or more users can provide input to the computer system. Computer system 210 may also be connected to a network such as network 220, through which computer system 210 can communicate with other computer systems and devices. In one embodiment, the processes described herein may be performed by more than one computer system.

While the computer system described in FIG. 2 is capable of executing the processes described herein, this computer system is simply one example of a computer system capable of executing such processes. Those skilled in the art will appreciate that many other computer system designs may be capable of performing the processes described here.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Figure 3:
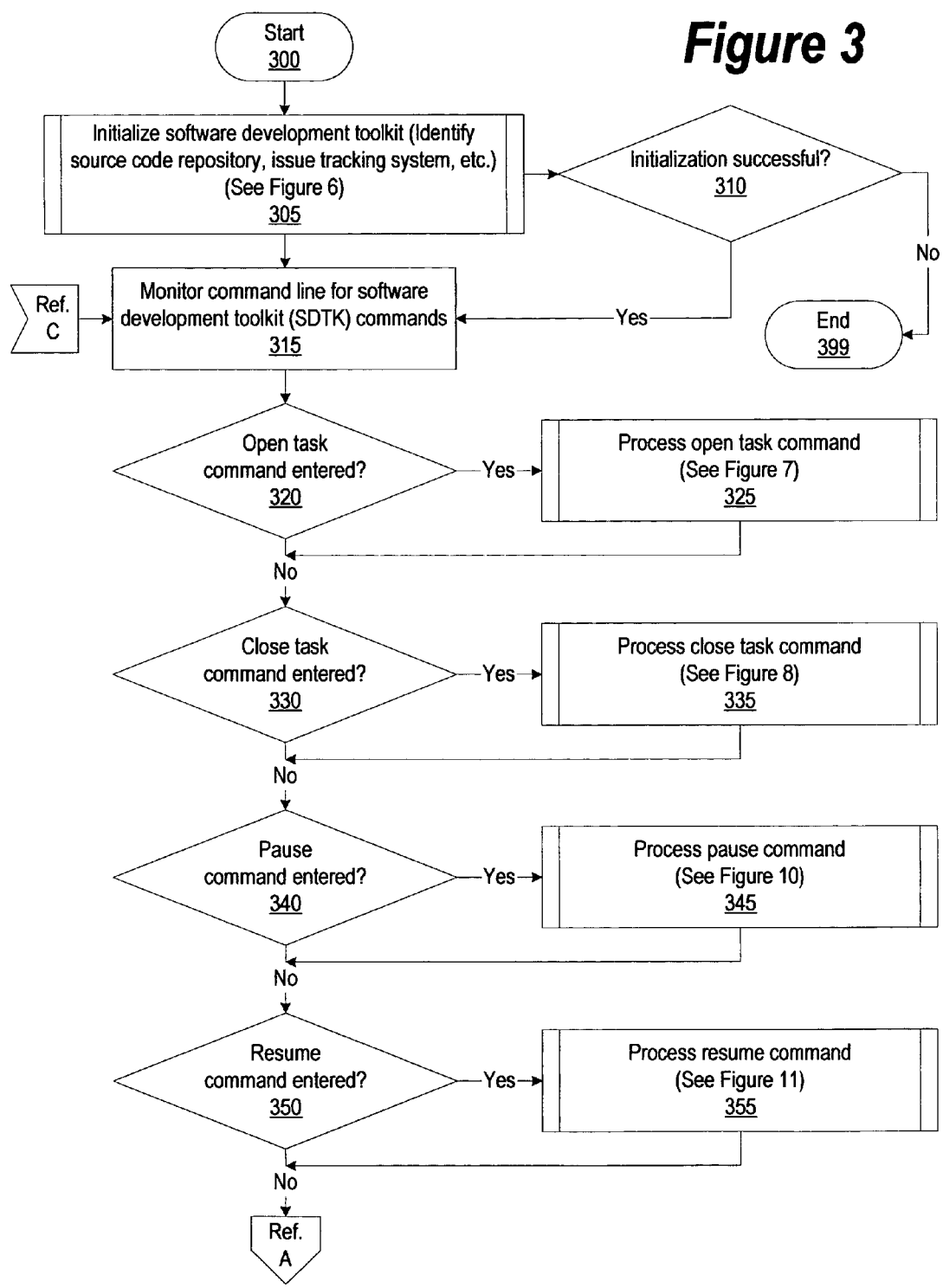
FIG. 3 is a flowchart illustrating one embodiment of a method for processing user commands using the software development toolkit.

FIG. 3 is a flowchart illustrating one embodiment of a method for processing user commands using the software development toolkit. Processing begins at 300 whereupon, at predefined process 305, the software development toolkit is initialized. During initialization, among other tasks, the existing source code repository and issue tracking system, if present, are identified. More details on the processing that takes place at predefined process 305 are provided in the flowchart of FIG. 4 and corresponding text.

A determination is then made as to whether the initialization was successful at decision 310. If the initialization was successful, decision 310 branches to the "yes" branch whereupon, at step 305, the system begins monitoring the command line (or another type of user interface) for software development toolkit (SDTK) commands. On the other hand, if the initialization is not successful, decision 310 branches to the "no" branch whereupon processing ends at 399. A message may be also sent to a user or entered in a log file indicating that the initialization of the software development toolkit failed.

A determination is then made as to whether an "open task" command was entered on the command line at decision 320. If an "open task" command was entered on the command line, decision 320 branches to the "yes" branch whereupon, at predefined process 325, the "open task" command is processed by the SDTK. On the other hand, if an "open task" command was not entered, decision 320 branches to the "no"

branch bypassing predefined process 325. More details on the processing that takes place at predefined process 325 are provided in the flowchart of FIG. 7 and corresponding text.

A determination is then made as to whether a "close task" command was entered on the command line at decision 330. If a "close task" command was entered on the command line, decision 330 branches to the "yes" branch whereupon, at predefined process 335, the "close task" command is processed by the SDTK. On the other hand, if a "close task" command was not entered, decision 330 branches to the "no" branch bypassing predefined process 335. More details on the processing that takes place at predefined process 335 are provided in the flowchart of FIG. 8 and corresponding text.

A determination is then made as to whether a "pause" command was entered on the command line at decision 340. If a "pause" command was entered on the command line, decision 340 branches to the "yes" branch whereupon, at predefined process 345, the "pause" command is processed by the SDTK. On the other hand, if a "pause" command was not entered, decision 340 branches to the "no" branch bypassing predefined process 345. More details on the processing that takes place at predefined process 345 are provided in the flowchart of FIG. 10 and corresponding text.

A determination is then made as to whether a "resume" command was entered on the command line at decision 350. If a "resume" command was entered on the command line, decision 350 branches to the "yes" branch whereupon, at predefined process 355, the "resume" command is processed by the SDTK. On the other hand, if a "resume" command was not entered, decision 350 branches to the "no" branch bypassing predefined process 355 More details on the processing that takes place at predefined process 355 are provided in the flowchart of FIG. 11 and corresponding text.

Processing subsequently continues on the flowchart of FIG. 4 (See Ref. A).

Figure 4:
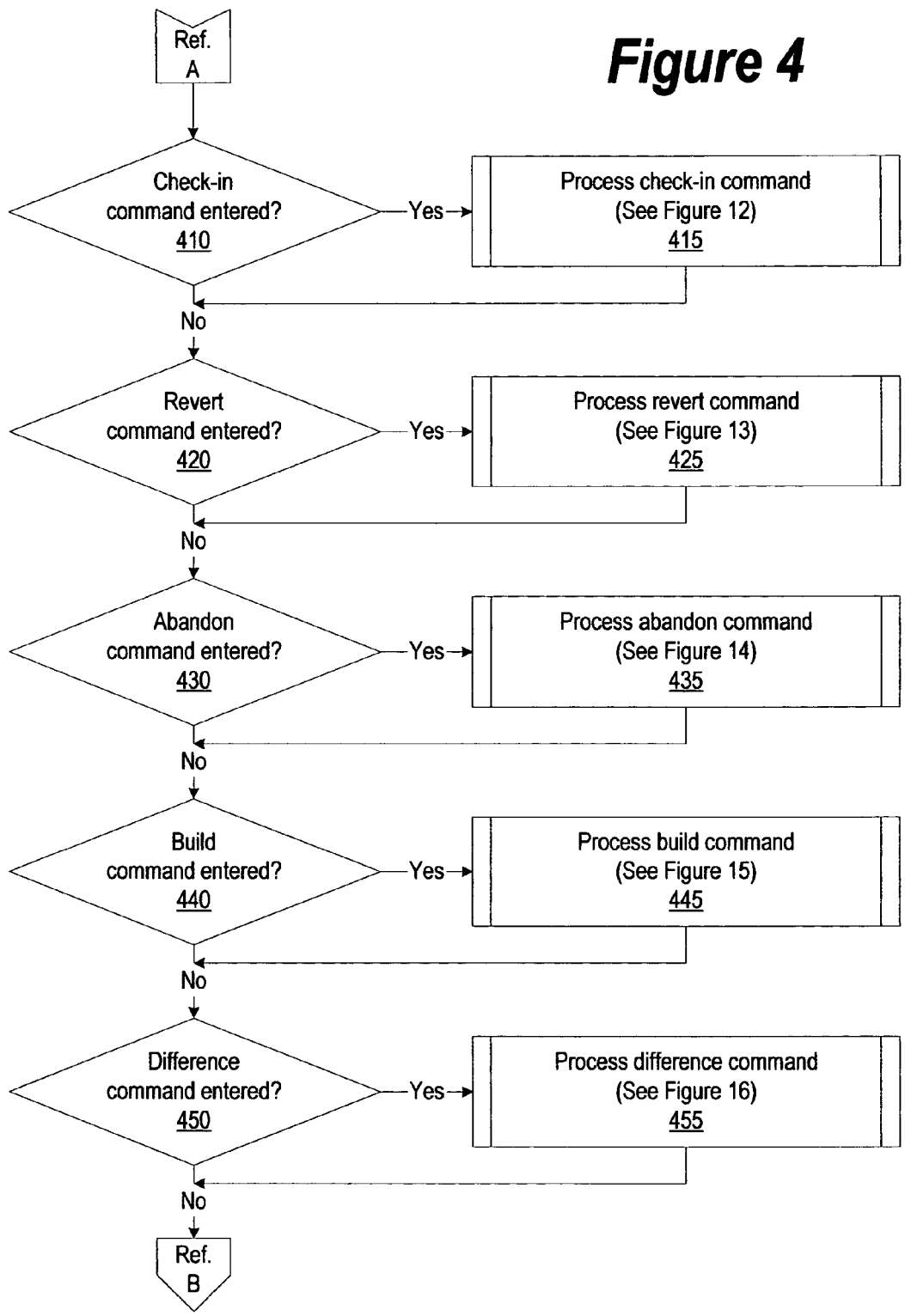
FIG. 4 is a flowchart (which is a continuation of the flowchart of FIG. 3) illustrating one embodiment of a method for processing user commands using the software development toolkit.

FIG. 4 is a flowchart (which is a continuation of the flowchart of FIG. 3) illustrating one embodiment of a method for processing user commands using the software development toolkit. Processing continues from FIG. 3 (See Ref. A). A determination is then made as to whether a "check-in" command was entered on the command line at decision 410. If a "check-in" command was entered on the command line, decision 410 branches to the "yes" branch whereupon, at predefined process 415, the "check-in" command is processed by the SDTK. On the other hand, if a "check-in" command was not entered, decision 410 branches to the "no" branch bypassing predefined process 415. More details on the processing that takes place at predefined process 415 are provided in the flowchart of FIG. 12 and corresponding text.

A determination is then made as to whether a "revert" command was entered on the command line at decision 420. If a "revert" command was entered on the command line, decision 420 branches to the "yes" branch whereupon, at predefined process 425, the "revert" command is processed by the SDTK. On the other hand, if a "revert" command was not entered, decision 420 branches to the "no" branch bypassing predefined process 425. More details on the processing that takes place at predefined process 425 are provided in the flowchart of FIG. 13 and corresponding text.

A determination is then made as to whether an "abandon" command was entered on the command line at decision 430. If an "abandon" command was entered on the command line, decision 430 branches to the "yes" branch whereupon, at predefined process 435, the "abandon" command is processed by the SDTK. On the other hand, if an "abandon" command was not entered, decision 430 branches to the "no" branch bypassing predefined process 435. More details on the processing that takes place at predefined process 435 are provided in the flowchart of FIG. 14 and corresponding text.

A determination is then made as to whether a "build" command was entered on the command line at decision 440. If a "build" command was entered on the command line, decision 440 branches to the "yes" branch whereupon, at predefined process 445, the "build" command is processed by the SDTK. On the other hand, if a "build" command was not entered, decision 440 branches to the "no" branch bypassing predefined process 445. More details on the processing that takes place at predefined process 445 are provided in the flowchart of FIG. 15 and corresponding text.

A determination is then made as to whether a "difference" command was entered on the command line at decision 450. If a "difference" command was entered on the command line, decision 450 branches to the "yes" branch whereupon, at predefined process 455, the "difference" command is processed by the SDTK. On the other hand, if a "difference" command was not entered, decision 450 branches to the "no" branch bypassing predefined process 455. More details on the processing that takes place at predefined process 455 are provided in the flowchart of FIG. 16 and corresponding text.

Processing subsequently continues on the flowchart of FIG. 5 (See Ref. B).

Figure 5:
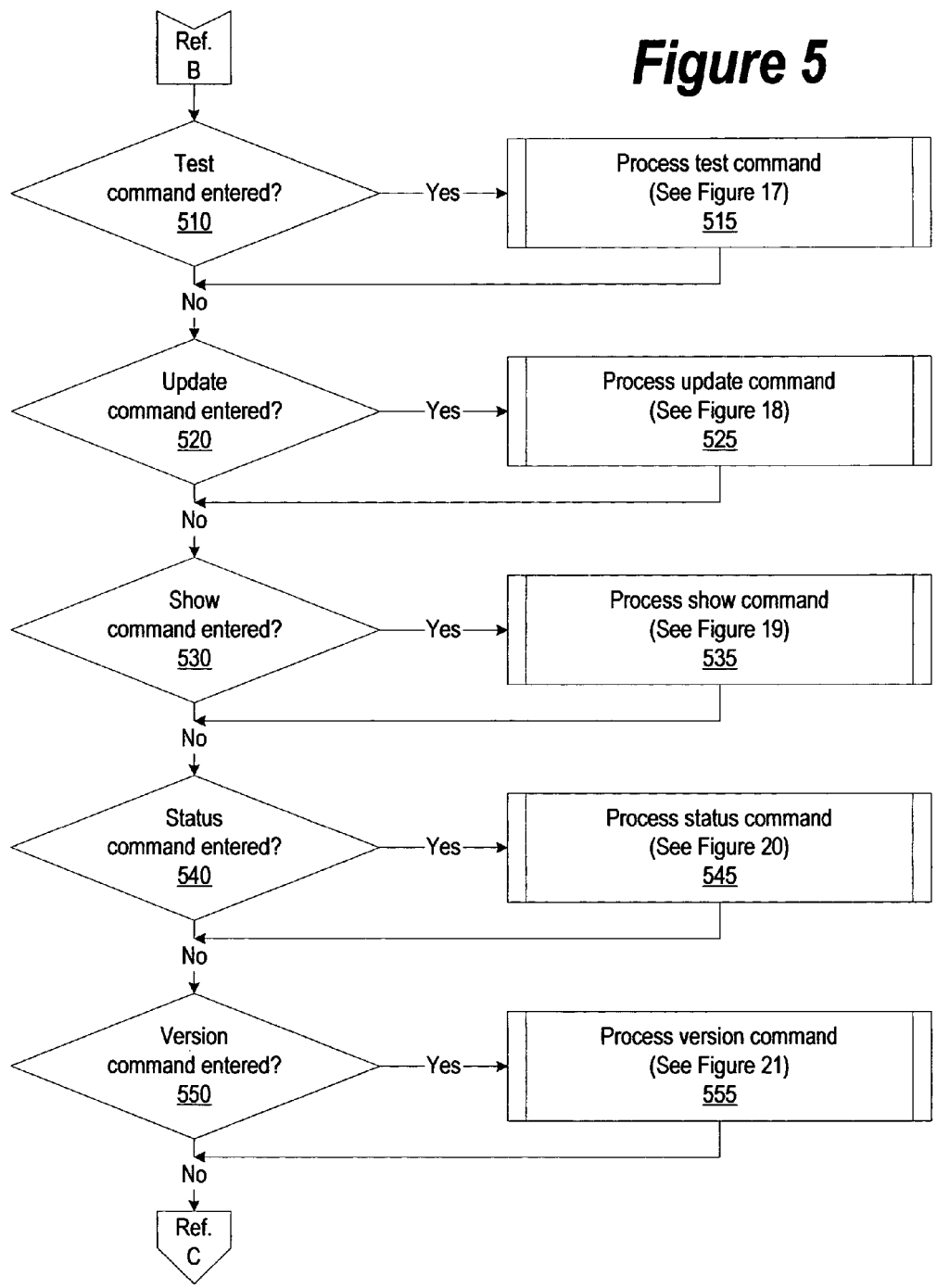
FIG. 5 is a flowchart (which is a continuation of the flowchart of FIG. 4) illustrating one embodiment of a method for processing user commands using the software development toolkit.

FIG. 5 is a flowchart (which is a continuation of the flowchart of FIG. 4) illustrating one embodiment of a method for processing user commands using the software development toolkit. Processing continues from FIG. 4 (See Ref. B). A determination is then made as to whether a "test" command was entered on the command line at decision 510. If a "test" command was entered on the command line, decision 510 branches to the "yes" branch whereupon, at predefined process 515, the "test" command is processed by the SDTK. On the other hand, if a "test" command was not entered, decision 510 branches to the "no" branch bypassing predefined process 515. More details on the processing that takes place at predefined process 515 are provided in the flowchart of FIG. 17 and corresponding text.

A determination is then made as to whether an "update" command was entered on the command line at decision 520. If an "update" command was entered on the command line, decision 520 branches to the "yes" branch whereupon, at predefined process 525, the "update" command is processed by the SDTK. On the other hand, if an "update" command was not entered, decision 520 branches to the "no" branch bypassing predefined process 525. More details on the processing that takes place at predefined process 525 are provided in the flowchart of FIG. 18 and corresponding text.

A determination is then made as to whether a "show" command was entered on the command line at decision 530. If a "show" command was entered on the command line, decision 530 branches to the "yes" branch whereupon, at predefined process 535, the "show" command is processed by the SDTK. On the other hand, if a "show" command was not entered, decision 530 branches to the "no" branch bypassing predefined process 535. More details on the processing that takes place at predefined process 535 are provided in the flowchart of FIG. 19 and corresponding text.

A determination is then made as to whether a "status" command was entered on the command line at decision 540. If a "status" command was entered on the command line, decision 540 branches to the "yes" branch whereupon, at predefined process 545, the "status" command is processed by the SDTK. On the other hand, if a "status" command was not entered, decision 540 branches to the "no" branch bypassing predefined process 545. More details on the processing that takes place at predefined process 545 are provided in the flowchart of FIG. 20 and corresponding text.

A determination is then made as to whether a "version" command was entered on the command line at decision 550. If a "version" command was entered on the command line, decision 555 branches to the "yes" branch whereupon, at predefined process 555, the "version" command is processed by the SDTK. On the other hand, if a "version" command was not entered, decision 550 branches to the "no" branch bypassing predefined process 555. More details on the processing that takes place at predefined process 555 are provided in the flowchart of FIG. 21 and corresponding text.

Processing subsequently returns to the flowchart of FIG. 3 (See Ref. C).

Figure 6:
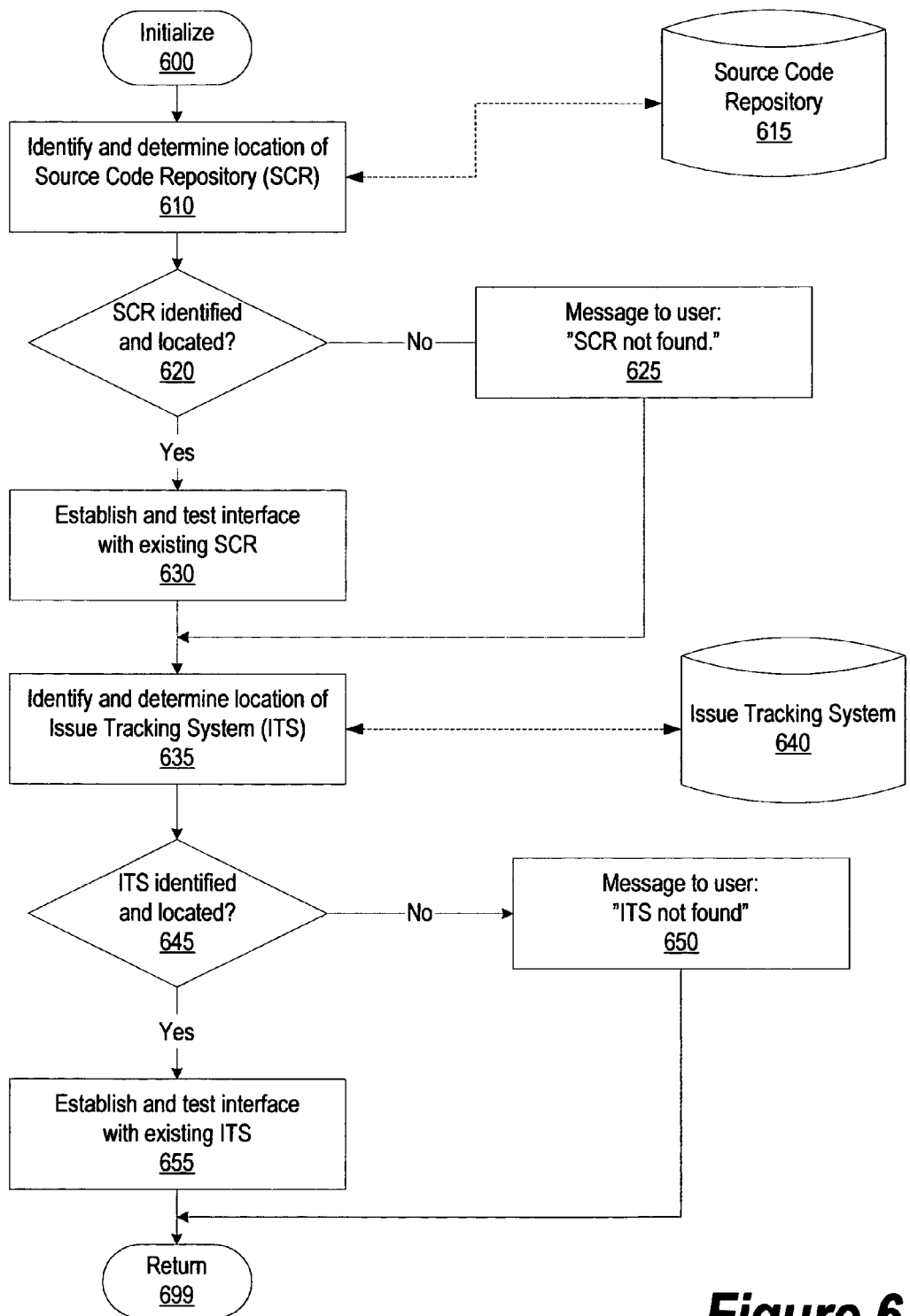
FIG. 6 is a flowchart illustrating one embodiment of a method for initializing the software development toolkit.

FIG. 6 is a flowchart illustrating one embodiment of a method for initializing the software development toolkit. Processing begins at 600 whereupon, at step 610, the existing source code repository (SCR) such as source code repository 615 is identified and the location of any existing source code is determined. A determination is then made as to whether a source code repository was found at decision 620. If a source code repository was not found, decision 620 branches to the "no" branch whereupon, at step 625, an error message is generated alerting the user that a source code repository was not found. Processing subsequently continues at step 635. If a source code repository was successfully found, decision 620 branches to the "yes" branch whereupon processing continues at step 630 bypassing step 625.

At step 630, an interface with the existing source code repository is established and tested. At step 635, an attempt is made to identify and determine the location of an existing issue tracking system (ITS) such as issue tracking system 640. A determination is then made as to whether an issue tracking system was identified and located at decision 645. If an issue tracking system was not identified and located, decision 645 branches to the "no" branch whereupon, at step 650, an error message is generated alerting the user that an existing issue tracking system was not found. Processing subsequently returns to the calling routine at step 699.

If an issue tracking system was found, decision 645 branches to the "yes" branch whereupon processing continues at step 655 bypassing step 650. At step 655, an interface with the existing issue tracking system is established and tested. Processing subsequently returns to the calling routine at 699.

Figure 7:
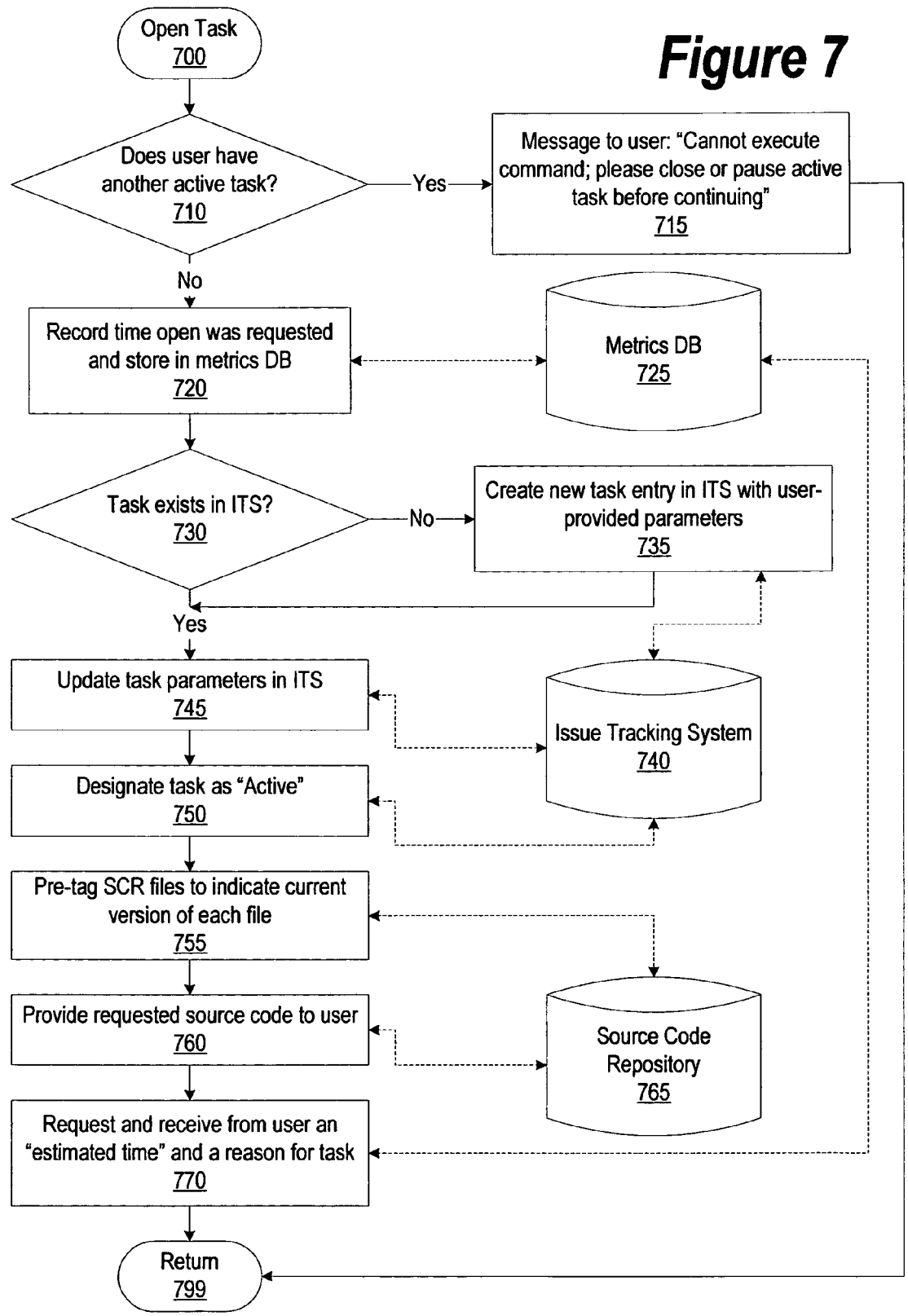
FIG. 7 is a flowchart illustrating one embodiment of a method for opening and setting up a new task using the software development toolkit.

FIG. 7 is a flowchart illustrating one embodiment of a method for opening and setting up a new task using the software development toolkit. Processing begins at 700 whereupon a determination is made as to whether the user has another task that is open and active at decision 710. If the user has an active task, decision 710 branches to the "yes" branch whereupon, at step 715, a message is sent to the user indicating that the requested command cannot be executed because the user has another open and active task. In one embodiment, the software development toolkit allows a user to have only one open and active task at a time. A user who wishes to open a task but already has another open active task may either first close the open task or place the open task on pause (i.e., making the open task inactive) before opening another task. In another embodiment, the software development toolkit may allow a user to have more than one task open. Processing subsequently returns to the calling routine at 799.

On the other hand, if the user does not have an active task, decision 710 branches to the "no" branch whereupon, at step 720, the time and date the open command was executed is recorded in metrics database 725. Among other things, the time information may be used to determine the total elapsed time from the opening of a task to the closing of a task as well as the total time a task was active. The active time may be determined by subtracting any time a task is inactive (paused) from the total elapsed time.

A determination is then made as to whether an entry for the task already exists in issue tracking system 740 at decision 730. If a task entry does not already exist, decision 730 branches to the "no" branch whereupon, at step 735, a task entry is created in issue tracking system 740. Any other parameters provided by the user during the open command may also be stored with the task entry in issue tracking system 740. On the other hand, if a task already exists in the issue tracking system, decision 730 branches to the "no" branch bypassing step 735.

Processing subsequently continues at step 745 where the task parameters in issue tracking system 740 are updated. In one embodiment, the update may be performed with parameters the user provided during the execution of the open command. In addition, at step 750, the task is designated as "active" in issue tracking system 740.

At step 755, all the files in the source code repository are given a tag to indicate the version of each of the files in the source code repository at the opening of this task. This pre-tagging takes place at this point in anticipation of a successful close of the task, in which case, only the tags for files that were modified by the task need to be updated. Tagging all the files in a source code repository can be a very time-consuming process, especially in cases where a high number of files exists.

At step 760, the user is given access to the requested files from source code repository 765. Typically, the user will request and be provided the latest version of the files. At step 770, a request is sent to the user requesting the opening of the task for an estimated time of completion as well as a reason for opening the current task. The user's time estimation may be used to determine a user's ability to correctly predict the time a certain task should take. A reason for opening a task may be to repair a defect, to add features to an existing product, or to perform administrative work such as changing a tool used by the software product. Processing subsequently returns to the calling routine at 799.

Figure 8:
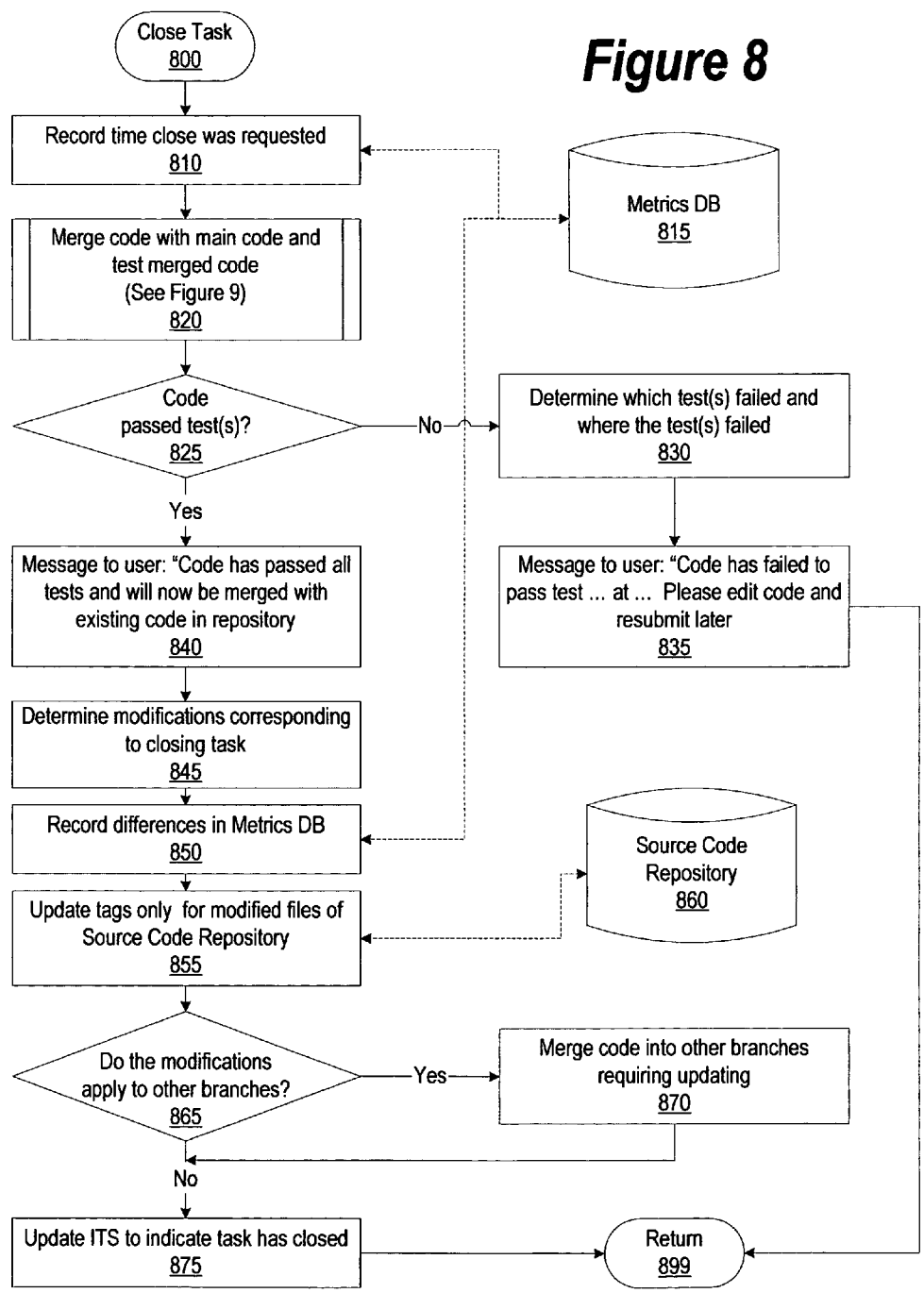
FIG. 8 is a flowchart illustrating one embodiment of a method for closing an existing task using the software development toolkit.

FIG. 8 is a flowchart illustrating one embodiment of a method for closing an existing task using the software development toolkit. Processing begins at 800 whereupon, at step 810, the time the close was requested is recorded in metrics database 815. The time of closing of a task may be used in conjunction with the time of opening of the task to determine the total elapsed time for which a task was open. Processing subsequently continues at predefined process 820 where the modified code associated with the task is merged with the main code of the parent branch of the task and then tested to determine whether the source code can pass one or more tests. More details on the processing that takes place at predefined process 820 are provided in the flowchart of FIG. 9 and corresponding text.

A determination is then made as to whether the merged modified source code passed the one or more required tests at decision 825. If the merged modified source code did not pass the one or more tests, decision 825 branches to the "no" branch whereupon, at step 830, the system determines which of the one or more tests failed and where in the source code the test failed. This information is then provided to the user at step 835. The user can use this information to repair the source code before attempting to close the task again. Processing subsequently returns to the calling routine at 899.

Returning to decision 825, if the merged source code passed all the required tests, decision 825 branches to the "yes" branch whereupon, at step 840, a message is sent to the user that the source code successfully passed all the required tests and that the source code will be merged with the main code of the parent branch for that task.

At step 845, the modifications to the source code attributed to the closing task are determined, and at step 850, the modifications information (which may include which lines were added, deleted, and changed for each modified file) is then stored in metrics database 815 along with other task information such as the reason for the task, the name of the developer, the programming language used, etc. At step 855, tags are updated only for the modified files in source code repository 860 in order to indicate the version of all the files at the closing of the issue. Only the tags for the modified files need to be updated since the tags for all the other files were already set to indicate the correct version of the files during the pre-tagging process at the opening of the issue.

A determination is then made as to whether the modifications corresponding to the closing task should be applied to source code in other branches in source code repository 850 at decision 865. For example, if the reason for opening the task was to repair a defect, the defect may also appear in other branches of the source code that share the same code as the existing branch. It is very likely that the same modifications (the ones corresponding to the closing task) will also repair the defect in other branches containing similar code. If the repair is unsuccessful, the modifications will not be applied to that branch. Testing is performed before the modifications are permanently applied to any branch by the software development toolkit.

If it is determined that other branches of the source could benefit from the modifications, decision 865 branches to the "yes" branch whereupon, at step 870, an attempt is made to merge the modifications into the other branches of the source code. On the other hand, if it is determined that the modifications do not apply to other branches of the source code, decision 865 branches to the "no" branch bypassing step 870. At step 875, the issue tracking system is updated to indicate that the task has been closed. Processing subsequently returns to the calling routine at 899.

Figure 9:
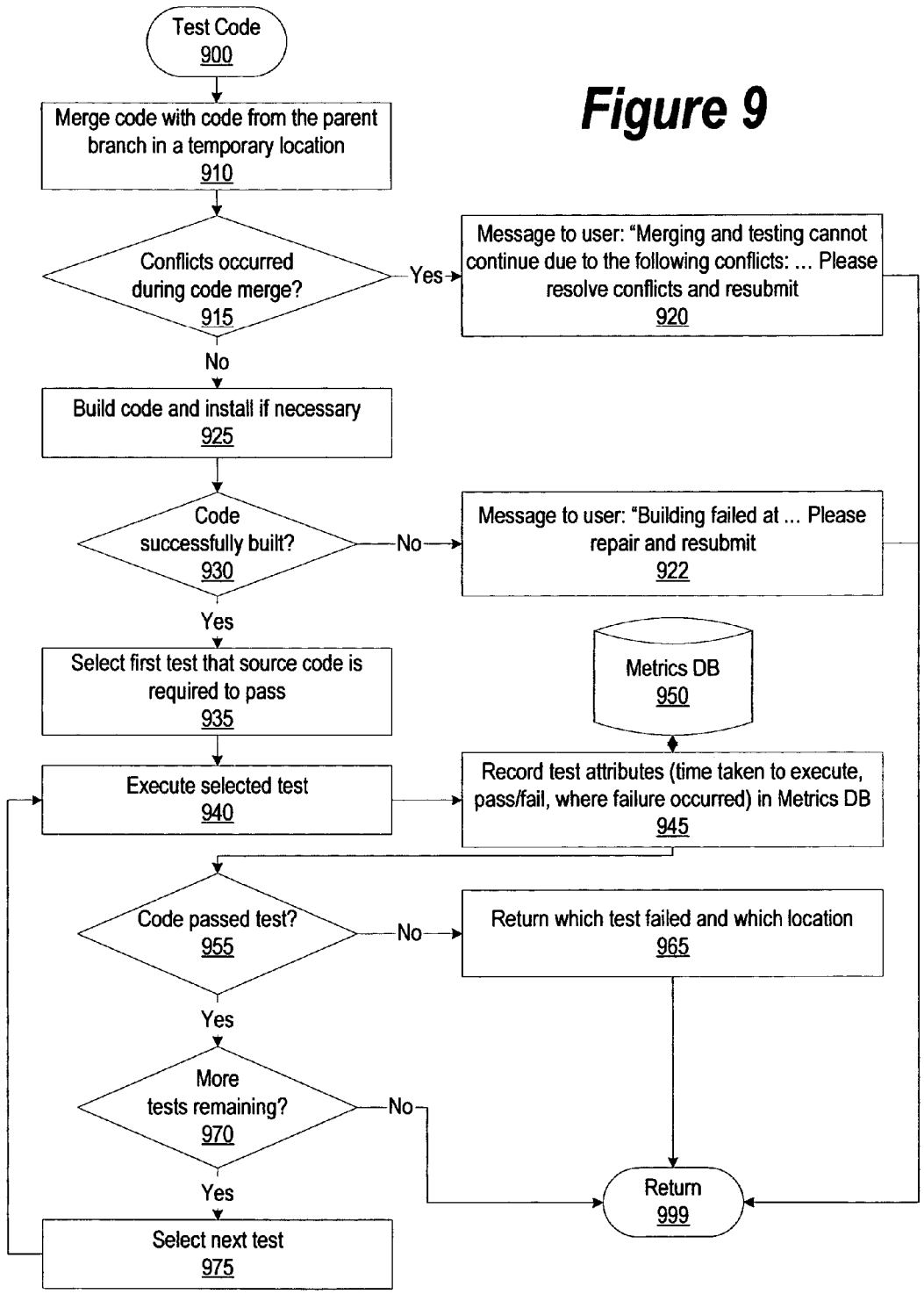
FIG. 9 is flowchart illustrating one embodiment of a method for testing source code corresponding to a task before closing the task and merging the source with the main source code of the parent branch.

FIG. 9 is flowchart illustrating one embodiment of a method for testing source code corresponding to a task before closing the task and merging the source with the main source code of the parent branch. Processing begins at 900 whereupon, at step 910, the main source code from the parent branch is merged with the modified code in a temporary location so that the merged code can be built and tested before updating the main source code.

A determination is then made as to whether conflicts occurred during the merging of the two source codes at decision 915. A conflict can occur, for example, if both the modified source code and the main source code contain modifications at the same location in the source code (i.e., different way of modifying the same line of code). This could occur if, for example, the main code was modified after the last time the source code corresponding to the task was updated with source code from the main branch.

If one or more conflicts occurred during the merge, decision 915 branches to the "yes" branch whereupon, at step 920, a message is sent to the user indicating that the merging and testing cannot continue due to conflicts. A list of the conflicts may then be provided to the user in order for the user to resolve the conflicts and to attempt to close the task again at a later time. Processing subsequently returns to the calling routine at 999.

On the other hand, if no conflicts occurred during the merging, decision 915 branches to the "no" branch whereupon, at step 925, the merged source code is built and if necessary installed so that it can be tested. A determination is then made as to whether the merged source code built successfully at decision 930. If the source code did not build successfully, decision 930 branches to the "no" branch whereupon, at step 922, a message is sent to the user indicating that the build failed and that the user should attempt to repair the defects and resubmit the source code at a later time. Processing subsequently returns to the calling routine at 999.

On the other hand, if the build was successful, decision 930 branches to the "yes" branch whereupon, at step 935, the first test—among a group of tests that the merged source code is required to pass before being accepted—is selected, and at step 940, the selected test is executed. In step 945, one or more attributes related to the test are then recorded in metrics database 950. Examples of test attributes include: the time it took to execute the test, whether the source code passed or failed the test, and where in the source code the test failed if it did. The collected information can be later used to determine when and how often to execute each one of the tests depending on how long a test takes to run, the likelihood of failure of a test, etc.

A determination is then made as to whether the merged source code passed the test at decision 955. If the source code did not pass the test, decision 955 branches to the "no" branch whereupon, at step 965, the name of the test that failed and the location in the source code where the test failed are returned. Subsequently processing returns to the calling routine at 999.

On the other hand, if the merged passed the test, decision 955 branches to the "yes" branch whereupon another determination is made as to whether more tests exist that must be executed at decision 970. If no more tests exist requiring execution, decision 970 branches to the "no" branch whereupon processing returns to the calling routine at 999.

On the other hand, if more tests requiring execution remain, decision 970 branches to the "yes" branch whereupon the next test to be executed is selected at step 975. Processing then loops back to step 940 where the newly selected test is executed. This looping continues until there are no more tests to process or until one of the tests fails.

Figure 10:
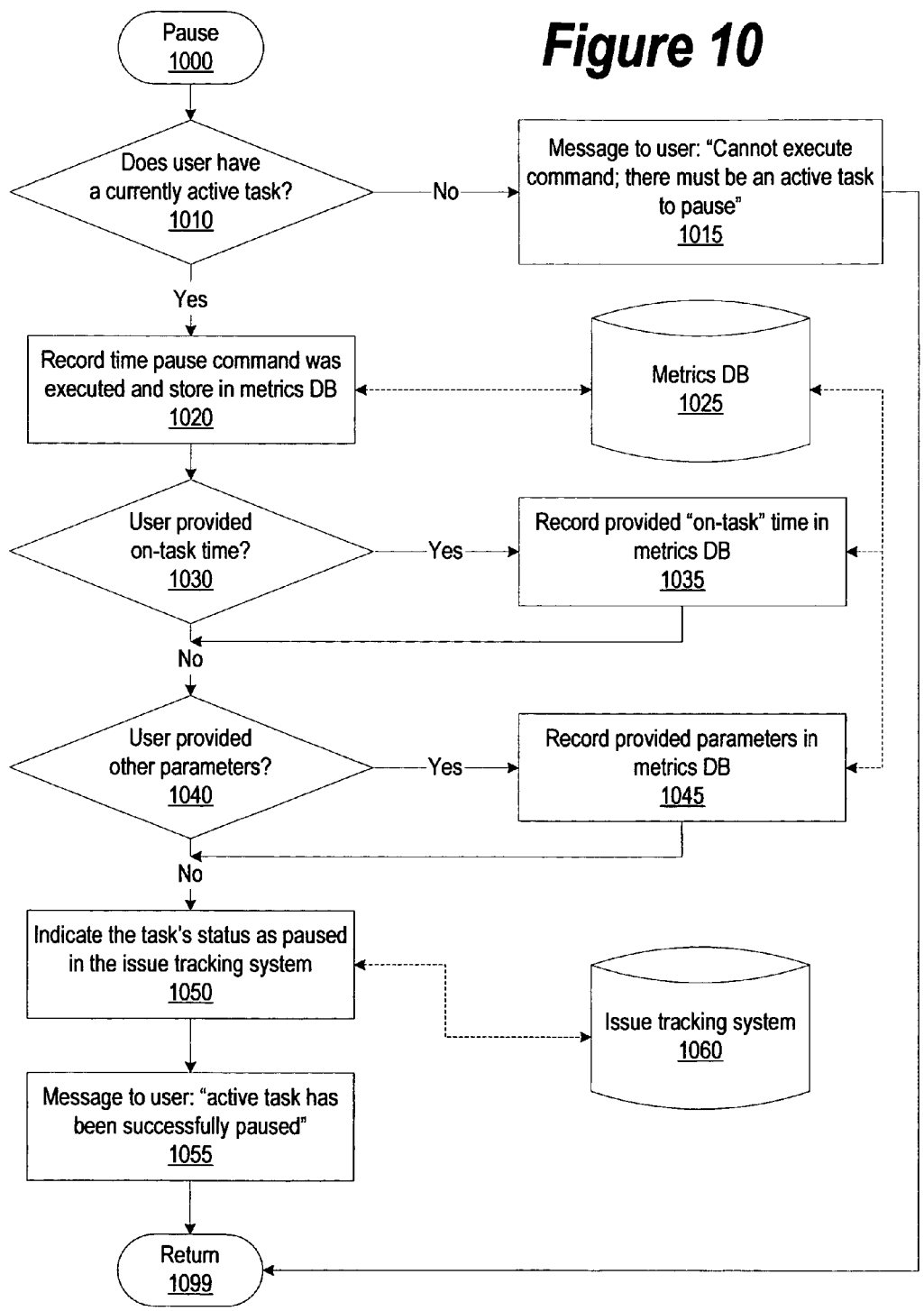
FIG. 10 is a flowchart illustrating one embodiment of a method for processing a pause command using the software development toolkit.

FIG. 10 is a flowchart illustrating one embodiment of a method for processing a pause command using the software development toolkit. Processing begins at 1000 whereupon, at decision 1010, a determination is made as to whether the user executing the pause command has an open and active task. Only open and active tasks can be paused. If the user does not have an open and active task, decision 1010 branches to the "no" branch whereupon, at step 1015, a message is sent to the user indicating that the pause command cannot be executed because the user must have an open active task that can be paused. Processing subsequently returns to the calling routine at 1099.

On the other hand, if the user has a currently open and active task, decision 1010 branches to the "yes" branch whereupon, at step 1020, the time the pause command was executed is recorded in metrics database 1025. Any time while an open task is paused is not counted towards the task's "active" time.

A determination is then made as to whether the user has provided an on-task time at decision 1030. An on-task time is the time that a user has actually spent working on the task (which does not include time spent in meetings, etc.). A user can keep a record of this time in order to provide this time to the system. If the user has provided an on-task time, decision 1030 branches to the "yes" branch whereupon, at step 1035, the provided on-task time is recorded in metrics database 1025. On the other hand, if no on-task time is provided, decision 1030 branches to the "no" branch bypassing step 1035.

A determination is then made as to whether the user has provided other parameters at decision 1040. For example, the user may provide a comment indicating why the user is pausing a task. If the user has provided additional parameters, decision 1040 branches to the "yes" branch whereupon, at step 1045, the provided parameters are recorded in metrics database 1045. On the other hand, if no additional parameters are provided, decision 1040 branches to the "no" branch bypassing step 1045.

At step 1050, the task's status is indicated as paused in issue tracking system 1060, and at step 1055, a confirmation is sent to the user indicating that the task has been successfully paused. Processing subsequently returns to the calling routine at 1099.

Figure 11:
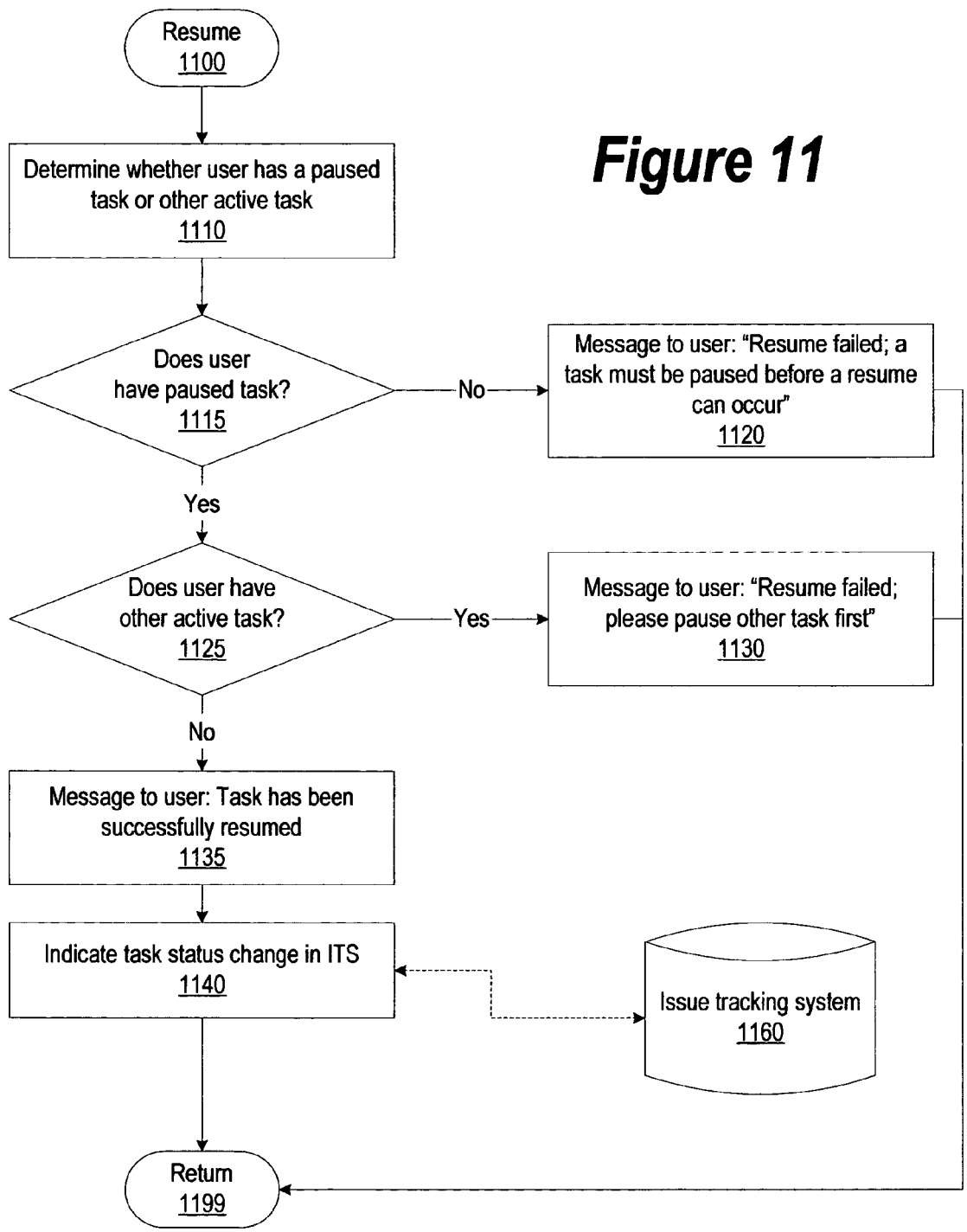
FIG. 11 is a flowchart illustrating one embodiment of a method for processing a resume command using the software development toolkit.

FIG. 11 is a flowchart illustrating one embodiment of a method for processing a resume command using the software development toolkit. Processing begins at 1100 whereupon, at step 1110, the system determines whether the user has a paused task and whether the user has another active task. A determination is then made as to whether the user has a paused task at decision 1115. If the user has does not have a paused task, decision 1115 branches to the "no" branch whereupon, at step 1120, a message is sent to the user indicating that the user cannot resume a task if the user has no paused tasks. Processing subsequently returns to the calling routine at 1199.

On the other hand, if the user has a paused task, decision 1115 branches to the "yes" branch whereupon a determination is made as to whether the user has an active task at decision 1125. If the user has another active task, decision 1125 branches to the "yes" branch whereupon, at step 1130, a message is sent to the user indicating that the user may not resume a task unless the user first pauses the user's active task. Processing subsequently returns to the calling routine at 1199.

On the other hand, if the user does not have another active task, decision 1125 branches to the "yes" branch whereupon, at step 1135, a message is sent to the user indicating that the task has been successfully resumed to the user. At step 1140, the status of the task is changed in issue tracking system 1160 to indicate that the task has been resumed. Processing subsequently returns to the calling routine at 1199.

Figure 12:
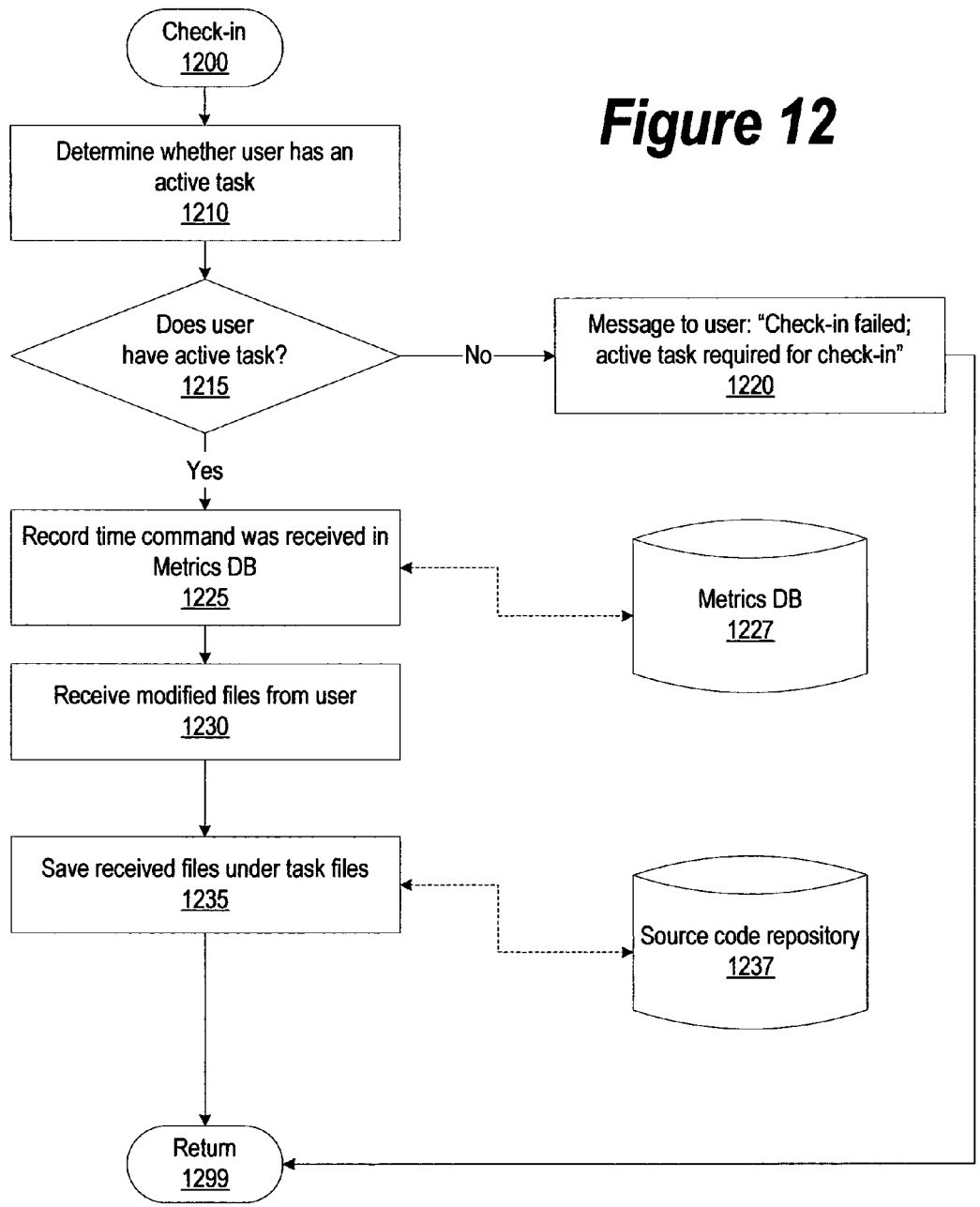
FIG. 12 is a flowchart illustrating one embodiment of a method for processing a check-in command using the software development toolkit.

FIG. 12 is a flowchart illustrating one embodiment of a method for processing a check-in command using the software development toolkit. The check-in command allows a user to save source files associated with an open task before the user has to commit the source with a close command. Processing begins at 1200 whereupon, at step 1210, the system determines whether the user has an active task from which to check-in files.

A determination is then made as to whether the user has an active task. If the user does not have an active task, decision 1215 branches to the "no" branch whereupon, at step 1220, a message is sent to the user indicating that the check-in has failed because the user must have an active task from which to check-in files. Processing subsequently returns to the calling routine at 1299.

On the other hand, if the user does have an active task, decision 1215 branches to the "yes" branch whereupon, at step 1225, the time the check-in command was received is recorded in metrics database 1227, and at step 1230, the modified files are received from the user. The received files are then stored in source code repository 1237 at step 1235. Processing subsequently returns to the calling routine at 1299.

Figure 13:
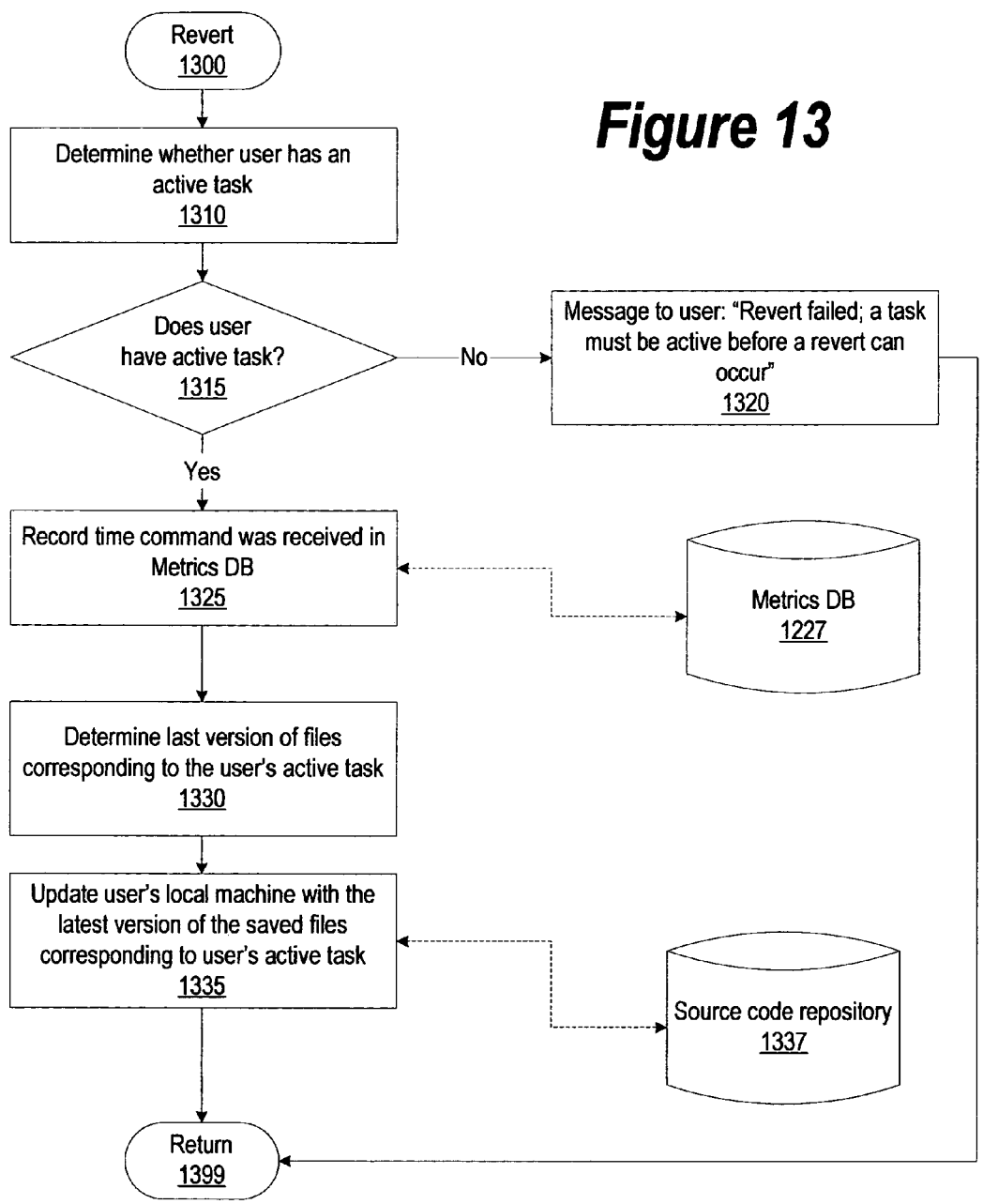
FIG. 13 is a flowchart illustrating one embodiment of a method for processing a revert command using the software development toolkit.

FIG. 13 is a flowchart illustrating one embodiment of a method for processing a revert command using the software development toolkit. The revert command allows a user to revert to the version of the source files saved during the last check-in performed by the user. Processing begins at 1300 whereupon, at step 1310, the system determines whether the user has an active task.

A determination is then made as to whether the user has an active task at decision 1315. If the user does not have an active task, decision 1315 branches to the "no" branch 1320 whereupon, at step 1320, a message is sent to the user indicating that the revert has failed since the user does not have a currently active task. Processing subsequently returns to the calling routine at 1399.

On the other hand, if the user does have an active task, decision 1315 branches to the "yes" branch whereupon, at step 1325, the time that the revert command was executed is recorded in metrics database 1227. At step 1330, the version of the files at the last check-in by the user is determined, and at step 1335, the latest saved version of the files is transferred from source code repository 1337 to the user's computer system. Processing subsequently returns to the calling routine at 1399.

Figure 14:
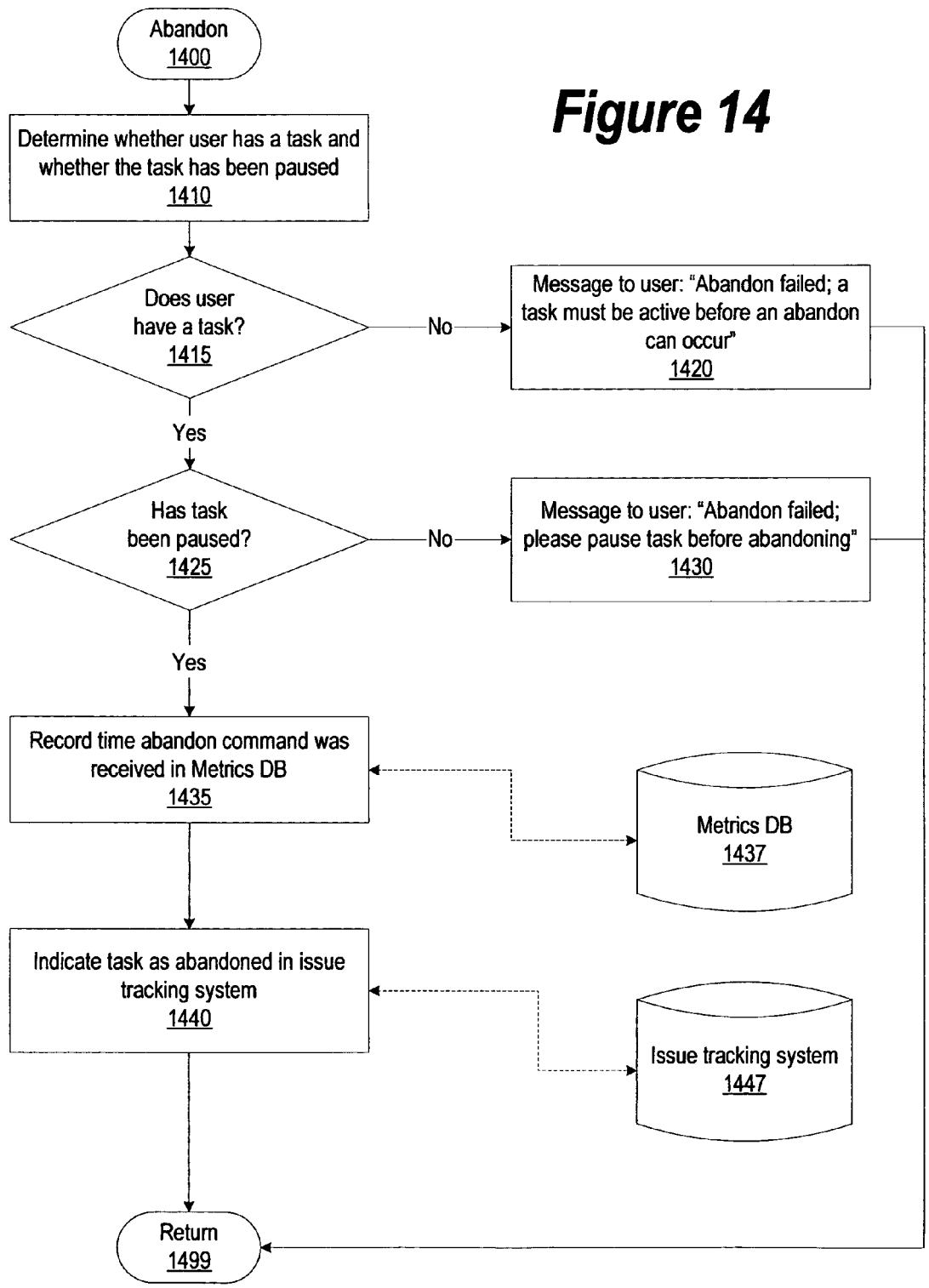
FIG. 14 is a flowchart illustrating one embodiment of a method for processing an abandon command using the software development toolkit.

FIG. 14 is a flowchart illustrating one embodiment of a method for processing an abandon command using the software development toolkit. The abandon command allows a user to abandon a task. Processing begins at 1400 whereupon, at step 1410, the system determines whether the user has a task and whether the task has been paused.

A determination is then made as to whether the user has a task at decision 1415. If the user does not have a task, decision 1415 branches to the "no" branch whereupon, at step 1420, a message is sent to the user indicating that the abandon command has failed because the user does not have a task to abandon. Processing subsequently returns to the calling routine at 1499.

On the other hand, if the user does have a task, a determination is made as to whether the user has first paused the task at decision 1425. If the user has not first paused the task, decision 1425 branches to the "no" branch whereupon, at step 1430, a message is sent to the user indicating that the abandon has failed because the user must first pause the active task. Processing subsequently returns to the calling routine at 1499.

On the other hand, if the task has been first paused, decision 1425 branches to the "yes" branch whereupon, at step 1435, the time that the abandon command was executed is recorded in metrics database 1437. At step 1440, the task is indicated as abandoned in issue tracking system 1447. Processing subsequently returns to the calling routine at 1499.

Figure 15:
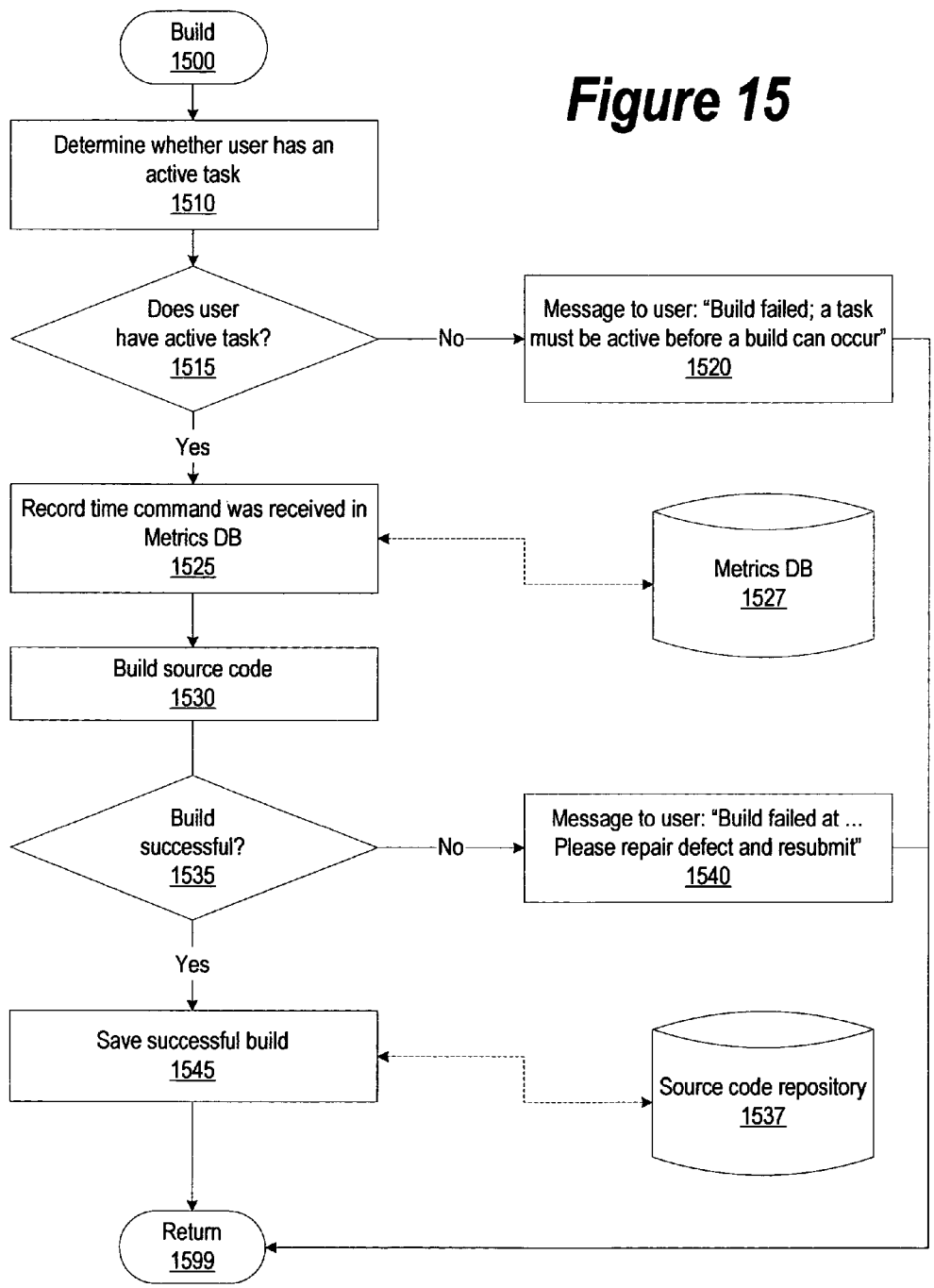
FIG. 15 is a flowchart illustrating one embodiment of a method for processing a build command using the software development toolkit.

FIG. 15 is a flowchart illustrating one embodiment of a method for processing a build command using the software development toolkit. The build command allows a user to build the source code associated with the user's task to determine whether the source can be built. The user may then also proceed with testing the source code. Processing begins at 1500 whereupon, at step 1510, a determination is made as to whether the user has an active task to build at decision 1515. If the user does not have an active task, decision 1515 branches to the "no" branch whereupon, at step 1520, a message is sent to the user indicating that for the build to take place, the user must have an active task. Processing subsequently returns to the calling routine at 1599.

On the other hand, if the user has an active task, decision 1515 branches to the "yes" branch whereupon, at step 1525, the time the build command was received is recorded in metrics database 1527. At step 1530, an attempt is made to build the source code. A determination is then made as to whether the build was successful at decision 1535. If the build was not successful, decision 1535 branches to the "no" branch whereupon, at step 1540, a message is sent to the user indicating that the build failed and where and asking the user to repair the defects and attempt to build again at a later time. Processing subsequently returns to the calling routine at 1599.

On the other hand, if the build was successful, decision 1535 branches to the "yes" branch whereupon, the successful build is saved in source code repository 1537. Processing subsequently returns to the calling routine at 1599.

Figure 16:
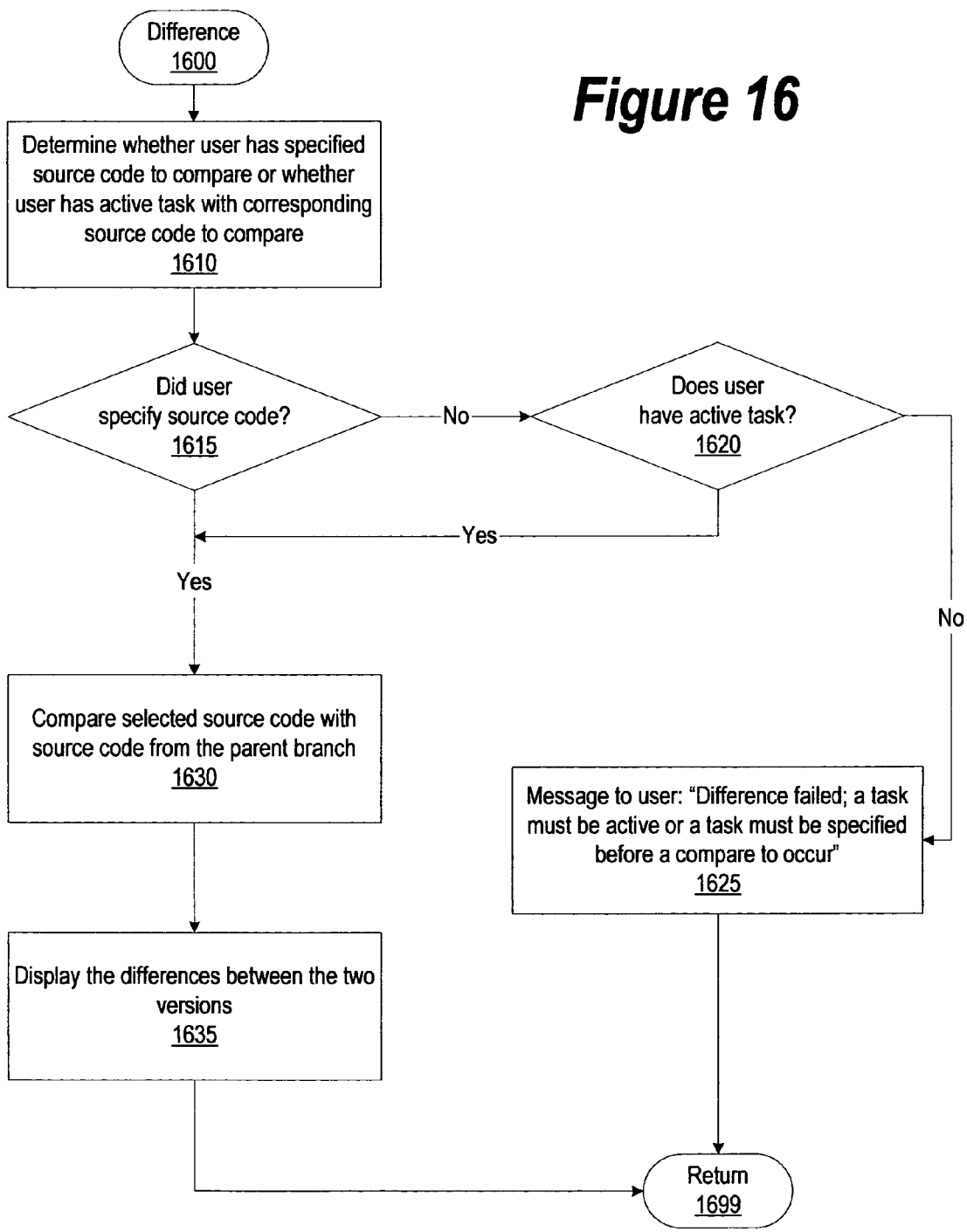
FIG. 16 is a flowchart illustrating one embodiment of a method for processing a difference command using the software development toolkit.

FIG. 16 is a flowchart illustrating one embodiment of a method for processing a difference command using the software development toolkit. The difference command allows a user to compare source code of two different versions to determine the differences between the two versions. Processing begins at 1600 whereupon, at step 1610, the system determines whether the user has specified a source code to compare or whether the user has an active task with corresponding source code.

A determination is then made as to whether the user specified source code to be compared at decision 1615. If the user did not specify source code, decision 1615 branches to the "no" branch whereupon another determination is made as to whether the user has an active task at decision 1620. If the user does not have an active task, decision 1620 branches to the "no" branch whereupon, at step 1625, a message is sent to user indicating that the difference failed and that for a difference to occur the user should either specify source code or have an active task with corresponding source code. Processing subsequently returns to the calling routine at 1699.

If the user has an active task, decision 1620 branches to the "yes" branch whereupon processing continues at step 1630. Returning to decision 1615, if the user did specify source code, decision 1615 branches to the "yes" branch whereupon, at step 1630, the selected source code is compared with the current version of the source code from the parent branch of the selected source code. At step 1635, the differences between the two versions are displayed to the user. Processing subsequently returns to the calling routine at 1699.

Figure 17:
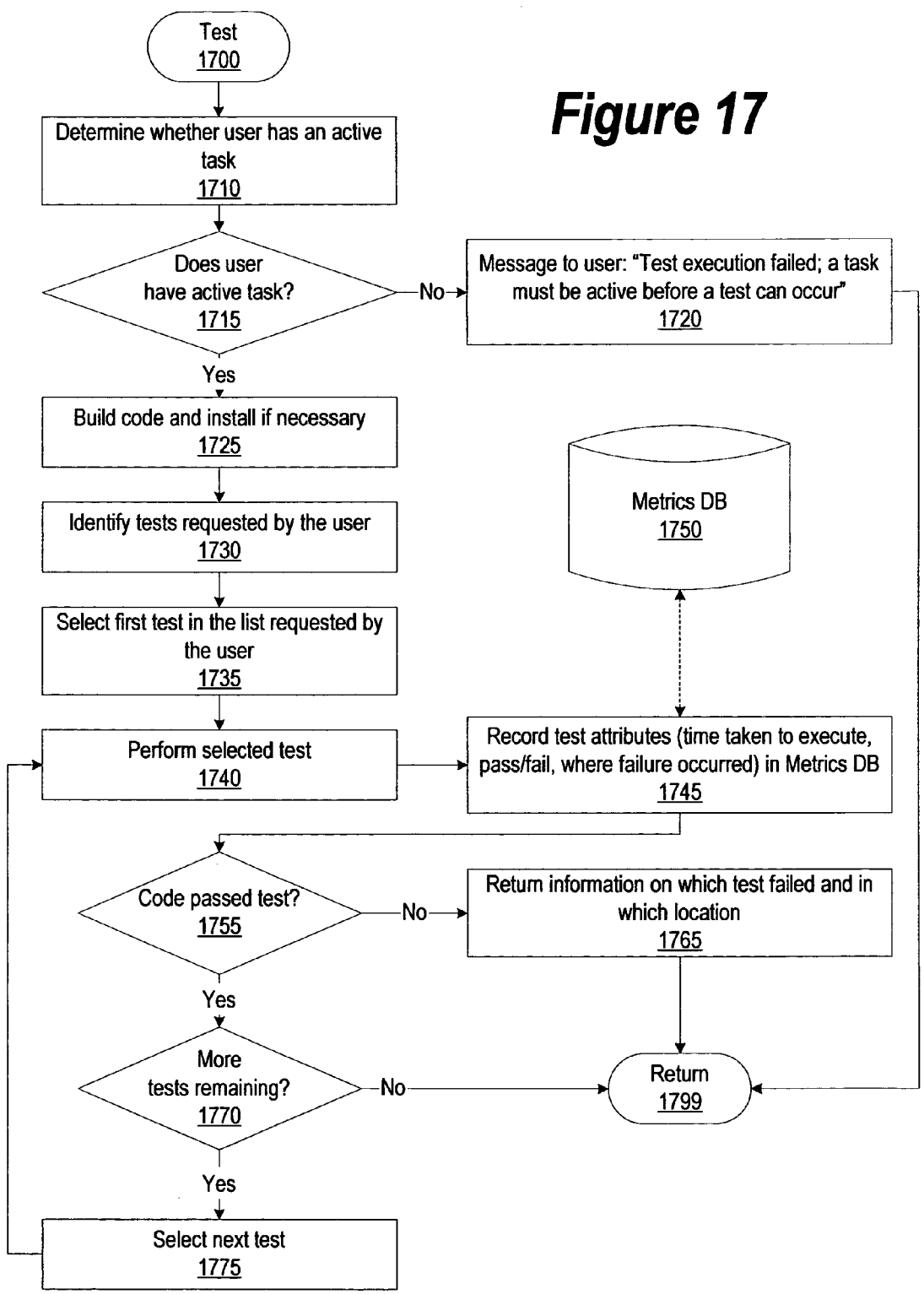
FIG. 17 is a flowchart illustrating one embodiment of a method for processing a test command using the software development toolkit.

FIG. 17 is a flowchart illustrating a method for processing a test command using the software development toolkit. The test command allows a user to choose and execute one or more tests to test a particular version of the source code. Processing begins at 1700 whereupon, at step 1710, a determination is made as to whether the user has an active task to test at decision 1715. If the user does not have an active task, decision 1715 branches to the "no" branch whereupon, at step 1720, a message is sent to the user indicating that for testing to take place, the user must have an active task. Processing subsequently returns to the calling routine at 1799.

On the other hand, if the user has an active task, decision 1715 branches to the "yes" branch whereupon, at step 1725, the source code is built and installed if necessary. At step 1730, the system identifies the test requested to be executed by the user, and at step 1735, the first test to be executed is selected at step 1740, the selected test is performed. At step 1745, one or more attributes related to the test are then recorded in metrics database 1750. Examples of test attributes include: the time it took to execute the test, whether the source code passed or failed the test, and where in the source code the test failed. The collected information can be later used to determine when to run each one of the tests depending on how long a test takes to run, the likelihood of failure of a test, etc.

A determination is then made as to whether the merged source code passed the test at decision 1755. If the source code did not pass the test, decision 1755 branches to the "no" branch whereupon, at step 1765, the name of test that failed and the location in the source code where the test failed are returned. Subsequently processing returns to the calling routine at 1799.

On the other hand, if the merged source code passed the test, decision 1755 branches to the "yes" branch whereupon another determination is made as to whether more tests exist that must be executed at decision 1770. If no more exist requiring execution, decision 1770 branches to the "no" branch whereupon processing returns to the calling routine at 1799.

On the other hand, if more tests requiring execution remain, decision 1770 branches to the "yes" branch whereupon the next test to be executed is selected at step 1775. Processing then loops back to step 1740 where the newly selected test is performed. This looping continues until there are no more tests to process or until one of tests fails.

Figure 18:
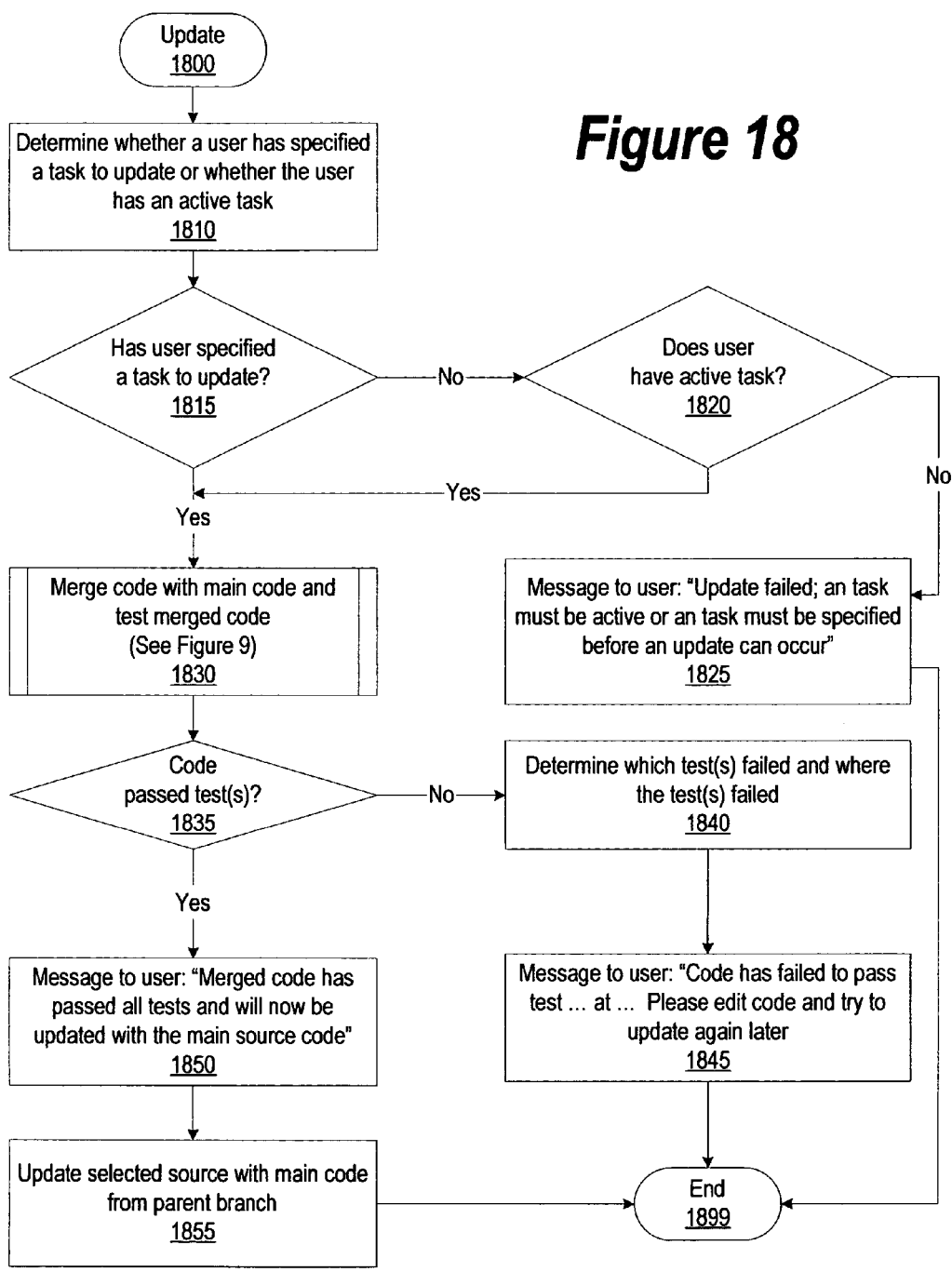
FIG. 18 is a flowchart illustrating one embodiment of a method for processing an update command using the software development toolkit.

FIG. 18 is a flowchart illustrating one embodiment of a method for processing an update command using the software development toolkit. The update command allows a user to update source code that is checked-out for a task with the changes made to the main source of the parent branch. The update does not occur unless there are no conflicts and the merged source code passes one or more tests. Processing begins at 1800 whereupon, at step 1810, the system determines whether the user has specified a source code to update or whether the user has an active task with corresponding source code.

A determination is then made as to whether the user specified source code to be updated at decision 1815. If the user did not specify source code, decision 1815 branches to the "no" branch whereupon another determination is made as to whether the user has an active task at decision 1820. If the user does not have an active task, decision 1820 branches to the "no" branch whereupon, at step 1825, a message is sent to user indicating that the update failed and that for an update to occur the user should either specify source code or have an active task with corresponding source code. Processing subsequently returns to the calling routine at 1899.

If the user has an active task, decision 1820 branches to the "yes" branch whereupon processing continues at predefined process 1830. Returning to decision 1815, if the user did specify source code, decision 1815 branches to the "yes" branch whereupon, at predefined process 1830 the selected source code is merged with the main code of the parent branch and then tested to determine whether the source code can pass one or more tests. More details on the processing that takes place at predefined process 1830 are provided in the flowchart of FIG. 9 and corresponding text.

A determination is then made as to whether the merged modified source code has the one or more required tests. If the merged modified source code did not pass the one or more tests, decision 1835 branches to the "no" branch whereupon, at step 1840, the system determines which of the one or more tests failed and where in the source code the one or more tests failed. This information is then provided to the user at step 1845. The user can use this information in repairing the source code before attempting to update again. Processing subsequently returns to the calling routine at 1899.

If the merged source code passed all the required tests, decision 1835 branches to the "yes" branch whereupon, at step 1850, a message is sent to the user that the source code successfully passed all the required tests and that the source code will be merged with the main code of the parent branch. At step 1855, the selected source code is updated with the main code from the parent branch. Processing subsequently returns to the calling routine at 1899.

Figure 19:
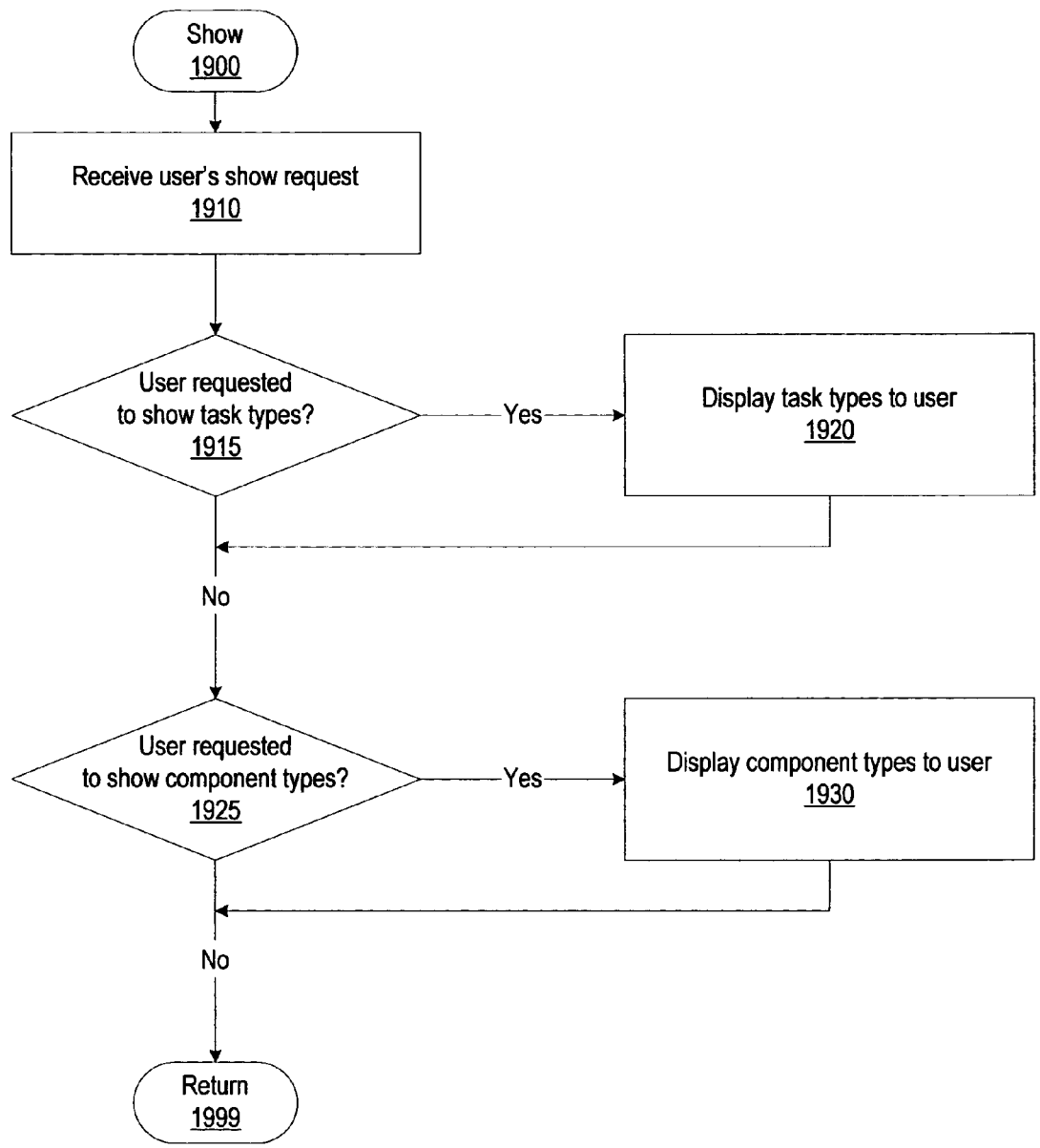
FIG. 19 is a flowchart illustrating one embodiment of a method for processing a show command using the software development toolkit.

FIG. 19 is a flowchart illustrating one embodiment of a method for processing a show command using the software development toolkit. The show command allows a user to display task types and component types. Task types may include, for example, feature addition, enhancement, defect repair, user interface or cosmetic change, administrative change, etc. Component type may include, for example, source control interface, issue tracking system interface, metric collection, metric reporting, general, administrative, toolkit server, toolkit client, regression test, etc.

Processing begins at 1900 whereupon, at step 1910, the user's show request is received and the system determines whether the request is to show task types or component types. A determination is then made as to whether the user requested task types at decision 1915. If the user requested task types, decision 1915 branches to the "yes" branch whereupon, at step 1920, the system displays the different task types to the user. Processing then continues at decision 1925.

On the other hand, if the user did not request task types, decision 1915 branches to the "no" branch whereupon, at decision 1925 a determination is made as to whether the user requested component types. If the user requested component types, decision 1925 branches to the "yes" branch whereupon, at step 1930, the system displays the different component types to the user. Processing subsequently returns to the calling routine at 1999. On the other hand, if the user did not request component types either, decision 1925 branches to the "no" branch whereupon processing returns to the calling routine at 1999.

Figure 20:
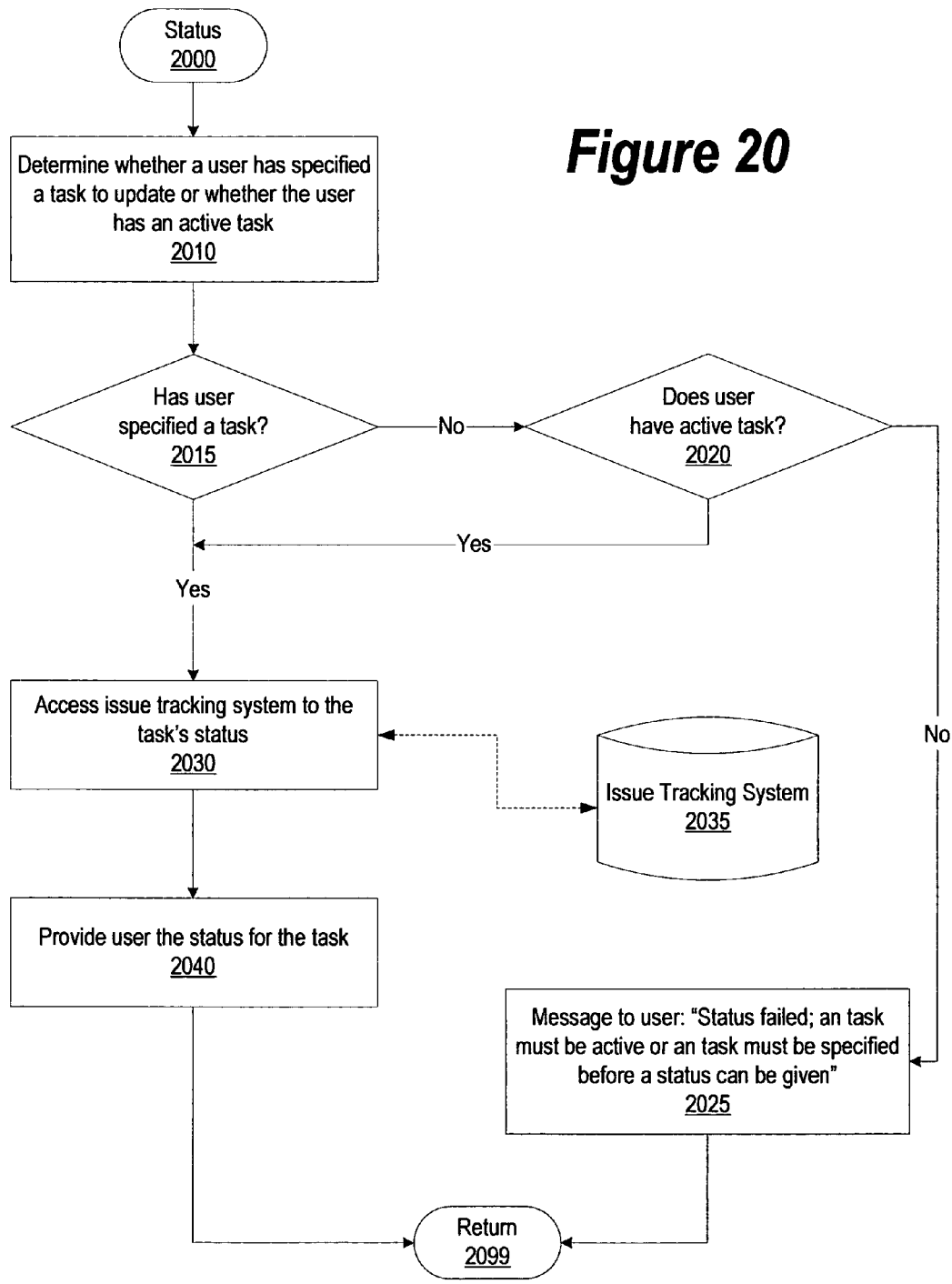
FIG. 20 is a flowchart illustrating one embodiment of a method for processing status command using the software development toolkit.

FIG. 20 is a flowchart illustrating one embodiment of a method for processing status command using the software development toolkit. The status command allows a user to examine the status of a task in the issue tracking system. Processing begins at 2000 whereupon, at step 2010, the system determines whether the user has specified a task for which to obtain a status or whether the user has an active task for which status is requested.

A determination is then made as to whether the user specified a task for which to obtain a status at decision 2015. If the user did not specify a task, decision 2015 branches to the "no" branch whereupon another determination is made as to whether the user has an active task at decision 2020. If the user does not have an active task, decision 2020 branches to the "no" branch whereupon, at step 2025, a message is sent to user indicating that the status request has failed and that for a status request to occur, the user should either specify a task or have an active task. Processing subsequently returns to the calling routine at 2099.

If the user has an active task, decision 2020 branches to the "yes" branch whereupon processing continues at step 2030. Returning to decision 2015, if the user did specify source code, decision 2015 branches to the "yes" branch whereupon, at step 2030, issue tracking system 2035 is accessed in order to determine the status of the task. At step 2040, the determined status for the task is provided to the user. Processing subsequently returns to the calling routine at 2099.

Figure 21:
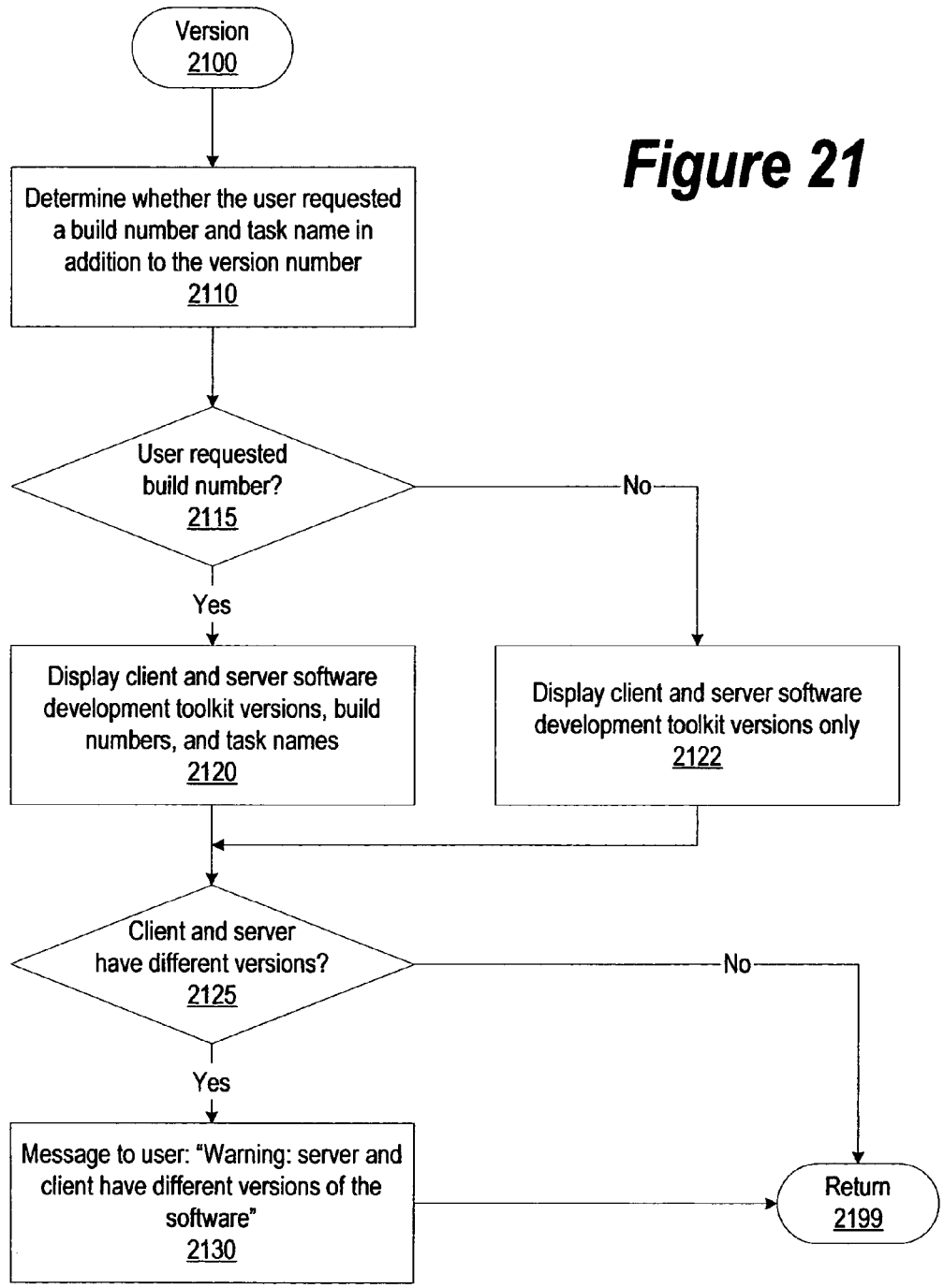
FIG. 21 is a flowchart illustrating one embodiment of a method for processing a version command using the software development toolkit.

FIG. 21 is a flowchart illustrating one embodiment of a method for processing a version command using the software development toolkit. The version command allows a user to display the client and server versions of the software development toolkit. Processing begins at 2100 whereupon, at step 2110, the system determines whether the user requested a build number and a task name in addition to the version number. A determination is then made as to whether the user requested the additional information at decision 2115. If the user did not request for additional information, decision 2115 branches to the "no" branch whereupon the client and server software version is displayed to the user. Processing subsequently continues at decision 2125.

On the other hand, if the user requested additional information, decision 2115 branches to the "yes" branch whereupon, at step 2120, the client and server software version is displayed to the user as well as the build number and the user's task name. A determination is then made as to whether the client and the server have different versions of the software at decision 2125. If the server and the client do not have different versions, decision 2125 branches to the "no" branch whereupon processing returns to the calling routine at 2199.

If the client and server have different versions of the software, decision 2125 branches to the "yes" branch whereupon, at step 2130, a message is displayed to the user warning the user that the two versions are different. Processing subsequently returns to the calling routine at 2199.

Figure 22:
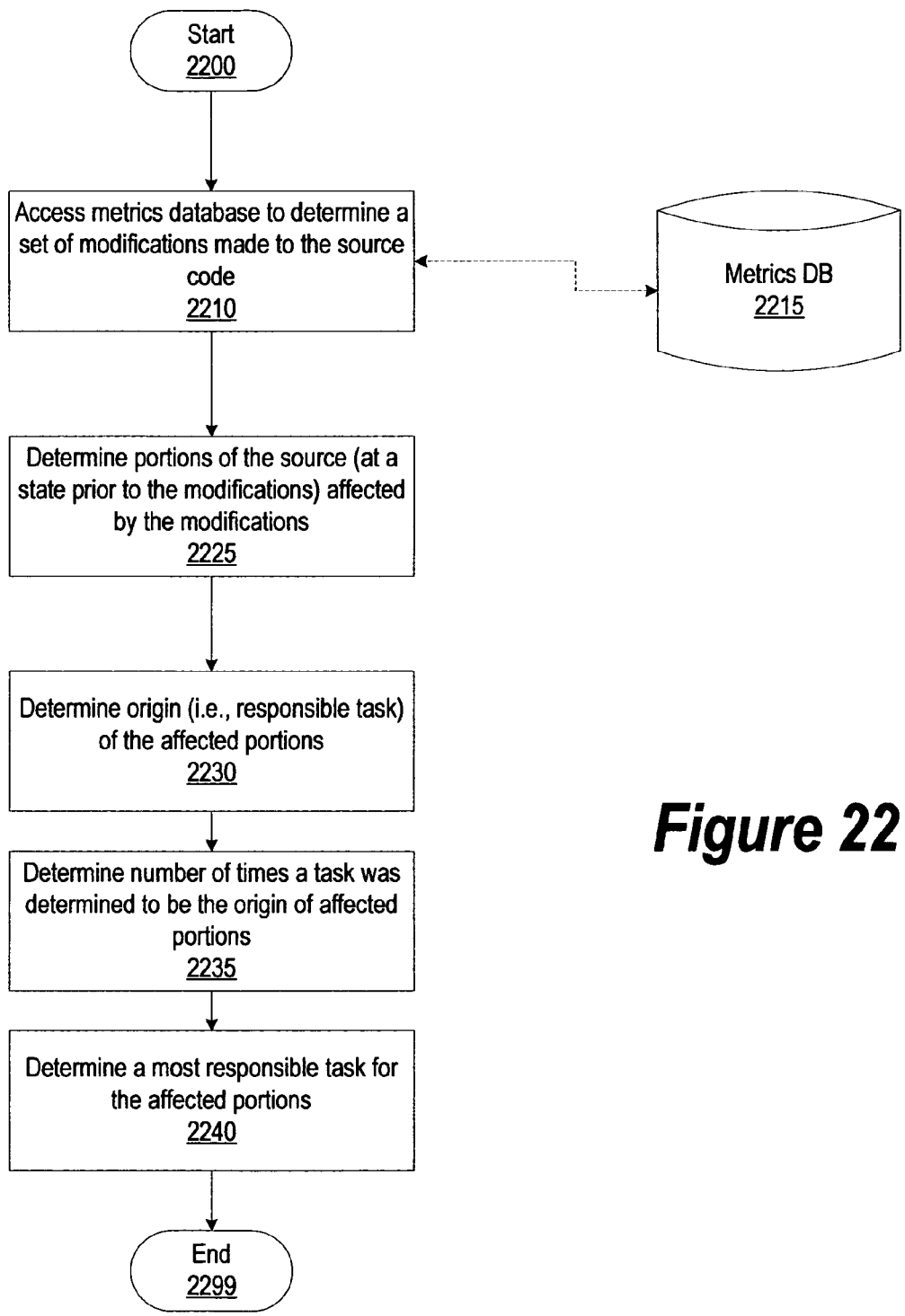
FIG. 22 is a flowchart illustrating one embodiment of a method for determining portions of source code responsible for additional source code modifications.

FIG. 22 is a flowchart illustrating one embodiment of a method for determining portions of source code responsible for additional source code modifications. Processing begins at 2200 whereupon, at step 2210, metrics database 2215 is accessed to determine a set of modifications made to the source code. For example, a set of modifications may be associated with all the modifications made as part of one task. In one embodiment, the previous modifications were stored in metrics database 2215 at the close of the task.

At step 2225, the portions of the source code, as the source code was prior to the application of the modifications, affected by the modifications are determined. If lines were deleted from the source code, the affected lines are the deleted lines; if lines were changed in the source code, the affected lines are the changed lines; and if lines of code were added to the source code, the affected lines are the lines above and below where the additions were made.

At step 2230, the origin of the affected portions of the source code is determined. That is, it is determined when and for what reason those portions were added to the source code. For example, an affected portion may have been added in order to add additional features to the software product. The name of the task, the reason for the task, the name of the programmer, and other such information may also be determined at this step.

At step 2235, the number of times that each task is responsible for an affected region is determined. For example, a first feature addition may be responsible for introducing five of the affected portions to the source and a second feature addition may be responsible for introducing only one.

At step 2240, the task most responsible for introducing the affected portions of the source code is determined. In one embodiment, the most responsible task may simply be the task having the highest number of affected portions. In another embodiment, statistical analysis may be used to determine the most responsible task. In yet another embodiment, the data for the responsible tasks may be presented as a plot of each task against the number of affected portions for each task. Subsequently processing ends at 2299.

Figure 23:
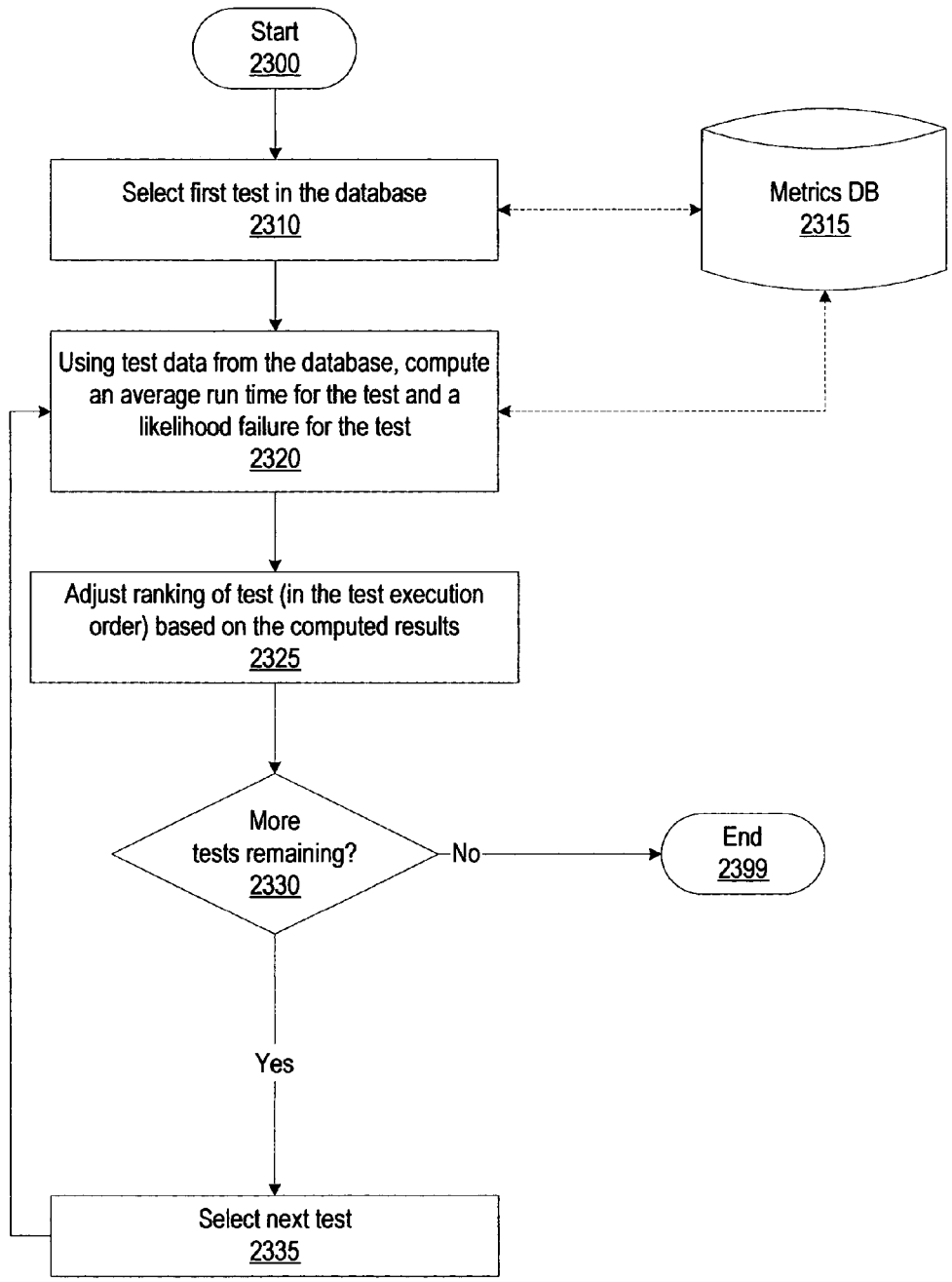
FIG. 23 is a flowchart illustrating one embodiment of a method for determining the order of test execution when testing source code in development.

FIG. 23 is a flowchart illustrating one embodiment of a method for determining the order of test execution when testing source code in development. Processing begins at 2300 whereupon, at step 2310, the first test is selected from metrics database 2315. At step 2320, using data from the database, an average run time and a likelihood of failure are computed for each test. The data used in the computation is data that was collected during previous executions of the tests such as the time it took for a test to finish executing and whether a test failed and where in the source code the test failed. In one embodiment, the average run time for a test may be computed by calculating the average of all the collected run times for the test. The failure likelihood for a test may be computed by calculating the ratio of the times a test failed to the number a test was executed. More sophisticated statistical analysis may also be employed to compute the average run time and failure likelihood as well as other parameters that may be relevant in determining when to execute each test. In addition, other related test data may also be collected. For example, the user may provide related test attributes.

At step 2325, the ranking of the tests (which indicates when and how often, for example, to execute a test) is adjusted according to the parameters computed and received at step 2320. In addition to determining when and how often to execute a test, other determination affecting the execution of test may be made. For example, it may be determined which portions of the source code a test affects, and as a result, avoid executing the test when those portions of the source code have not been modified.

A determination is then made as to whether more tests remain at decision 2330. If there are no more tests remaining, decision 2330 branches to the "no" branch whereupon processing ends at 2399. If more tests requiring ranking adjustment exist, decision 2330 branches to the "yes" branch whereupon, at step 2335, the next test is selected. Processing subsequently loops back to step 2330 for the next step to be processed. This looping continues until there are no more tests to be processed in metrics database 2315.

While particular embodiments have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the appended claims solely define the true spirit and scope. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. A method, executed by a computer, for managing source code, the method comprising the steps of:
    (a) providing a source code repository containing a first source code;
    (b) receiving a second source code from a developer, the second source code being functionally different from the first source code;
    (c) providing one or more tests, the one or more tests being configured to be applied to source code;
    (d) performing the one or more tests on the second source code;
    (e) determining whether the second source code passes the one or more tests; and
    (f) updating the first source code in the source code repository using the second source code after the second source code passes the one or more tests.

2. The method of claim 1, wherein step (b) is carried out no earlier than step (a).

3. The method of claim 1, further comprising, prior to step (e), updating the second source code using the first source code.

4. The method of claim 3, further comprising providing an initial source code, the first source code and the second source code each being a modified copy of the initial source code.

5. The method of claim 4, wherein step (f) comprises:
    determining first differences between the first source code and the initial source code; and
    applying the first differences to the second source code.

6. The method of claim 5, further comprising:
    determining second differences between the second source code and the initial source code;
    determining whether an overlap exists between the first differences and the second differences; and
    determining that an updating conflict exists when the overlap exists between the first differences and the second differences.

7. The method of claim 1, wherein step (e) comprises determining whether the second source code is buildable.

8. The method of claim 1, wherein step (e) comprises
    determining whether the second source code is buildable into a built second code, and
    determining whether the built second source code satisfies one or more additional tests.

9. The method of claim 1, further comprising:
    (g1) identifying a current build string;
    (g2) determining a next build string;
    (g3) adding the next build string to the second source code; and
    (g4) updating the current string with the next build string after the second source code passes the one or more tests during step (e).

10. The method of claim 9, wherein step (e) comprises determining whether the second source code is buildable.

11. The method of claim 9, wherein step (g1) comprises accessing a build string storage.

12. The method of claim 11, wherein step (g4) comprises inserting the next build string in the build string storage.

13. The method of claim 9, further comprising adding a link to a next build number, the link pointing to a version of the second source code corresponding to the next build.

14. The method of claim 1, wherein
    in step (a), the first source code has a first build string that indicates a current build version of the first source code, and the first build string is stored in a file,
    in step (b), the second source code has a second build string that indicates a current build version of the second source code, and
    in step (f), the second build string is added to the file.

15. The method of claim 14, wherein the one or more tests have test attributes and the test attributes include time to execute the one or more tests, passed/failed attributes, locations of failure in the second source code if the one or more tests fail, an average run time, and a failure likelihood.

16. The method of claim 1, wherein the one or more tests are configured to be applied to source code to be tested, and the one or more tests are selected to evaluate whether the source code to be tested is associated with a failure, a failure to build, a failure to produce a predicted/expected result, a failure attribute, a failure likelihood, a failed location, a failed runtime, and/or a failed test execution time.

17. An information handling system comprising one or more processors coupled to one or more memory units configured to store software development code, the software development code being configured to be executed by the one or more processors, the software development code being effective to carry out the steps of:
   (a) being provided a first source code in a source code repository;
   (b) receiving a second source code from a developer, the second source code being functionally different from the first source code;
   (c) being provided with one or more tests, the one or more test being configured to be applied to source code;
   (d) performing the one or more tests on the second source code;
   (e) determining whether the second source code passes the one or more tests; and
   (f) updating the first source code in the source code repository using the second source code after the second source code passes the one or more tests.

18. The information handling system of claim 17, wherein the software development code is effective to carry out step (b) no earlier than step (a).

19. The information handling system of claim 17, wherein the software development code is further effective, prior to step (e), to update the second source code using the first source code.

20. The information handling system of claim 19, wherein the software development code is further effective to be provided an initial source code, the first source code and the second source code each being a modified copy of the initial source code.

21. The information handling system of claim 19, wherein step (f) comprises:
   determining first differences between the source code and the initial source code; and
   applying the first differences to the second source code.

22. The information handling system of claim 21, wherein the software development code is further effective to:
   determine second differences between the second source code and the initial source code;
   determine whether an overlap exists between the first differences and the second differences; and
   determine that an updating conflict exists when the overlap exists between the first differences and the second differences.

23. The information handling system of claim 17, step (e) comprises determining whether the second source code being buildable.

24. The information handling system of claim 17, wherein step (e) comprises
   determining whether the second source code is buildable to obtain a built second code, and
   determining whether the built second source code satisfies one or more additional tests.

25. The information handling system of claim 17, wherein the software development code is further effective to carry out the steps of:
   (g1) identifying a current build string;
   (g2) determining a next build string;
   (g3) adding the next build string to the second source code; and
   (g4) updating the current string with the next build string after the second source code passes the one or more tests during step (e).

26. The information handling system of claim 25, wherein the second source code passing one or more tests step (e) comprises determining whether the second source code is buildable.

27. The information handling system of claim 25, wherein step (g1) comprises accessing a build string storage.

28. The information handling system of claim 27, wherein step (g4) comprises inserting the next build string in the build string storage.

29. The information handling system of claim 25, wherein the software development code is further effective to add a link to a next build number, the link pointing to a version of the second source code corresponding to the next build.

30. A computer program product stored on a computer operable medium, the computer program product comprising software code being effective to carry out the steps of:
   (a) being provided a first source code in a source code repository;
   (b) receiving a second source code from a developer, the second source code being functionally different from the first source code;
   (c) being provided one or more test, the one or more test being configured to be applied to source code;
   (d) performing the one or more tests on the second source code;
   (e) determining whether the second source code passes the one or more tests; and
   (f) updating the first source code using the second source code in response to the second source code passing the one or more tests.

31. The computer program product of claim 30, wherein step (b) is carried out no earlier than step (a).

32. The computer program product of claim 30, wherein the software code is further effective, prior to step (e), to update the second source code using the first source code.

33. The computer program product of claim 32, wherein the software code is further effective to provide an initial source code, the first source code and the second source code each being a modified copy of the initial source code.

34. The computer program product of claim 33, wherein step (f) comprises:
   determining first differences between the first source code and the initial source code; and
   applying the first differences to the second source code.

35. The computer program product of claim 34, wherein the software code is further effective to:
   determine second differences between the second source code and the initial source code;
   determine whether an overlap exists between the first differences and the second differences; and
   determine that an updating conflict exists when an overlap exists between the first differences and the second differences.

36. The computer program product of claim 30, wherein step (e) comprises determining whether the second source code is buildable.

37. The computer program product of claim 30, wherein step (f) comprises:
   determining whether the second source code is buildable to obtain a built second code, and
   determining whether the built second source code satisfies one or more additional tests.

38. The computer program product of claim 30, wherein the software code is further effective to carry out the steps of:
   (g1) identifying a current build string;
   (g2) determining a next build string;

(g3) adding the next build string to the second source code; and (g4) updating the current string with the next build string after the second source code passes the one or more tests during step (e).

39. The computer program product of claim 38, wherein step (e) comprises determining whether the second source code is buildable.

40. The computer program product of claim 38, wherein step (g1) comprises accessing a build string storage.

41. The computer program product of claim 40, wherein step (g4) comprises inserting the next build string in the build string storage.

42. The computer program product of claim 38, wherein the software code is further effective to add a link to a next build number, the link pointing to a version of the second source code corresponding to the next build.

* * * * *